(12) United States Patent
Miyamori et al.

(10) Patent No.: US 7,760,996 B2
(45) Date of Patent: Jul. 20, 2010

(54) IMAGE BLUR CORRECTION DEVICE AND CAMERA

(75) Inventors: Kenichi Miyamori, Hyogo (JP); Akio Konishi, Hyogo (JP); Keiji Sakamoto, Osaka (JP); Hideo Takenaka, Osaka (JP); Hideyuki Hashi, Osaka (JP)

(73) Assignee: Panasonic Corporation, Osaka (JP)

( * ) Notice: Subject to any disclaimer, the term of this patent is extended or adjusted under 35 U.S.C. 154(b) by 834 days.

(21) Appl. No.: 11/703,253

(22) Filed: Feb. 7, 2007

(65) Prior Publication Data

US 2007/0183766 A1    Aug. 9, 2007

(30) Foreign Application Priority Data

Feb. 8, 2006    (JP) .............................. 2006-031463

(51) Int. Cl.
G03B 17/00    (2006.01)
(52) U.S. Cl. .................................. 396/55; 348/208.11
(58) Field of Classification Search .................. 396/55; 348/208.4, 208.7, 208.8, 208.11
See application file for complete search history.

(56) References Cited

U.S. PATENT DOCUMENTS 5,835,799 A * 11/1998 Washisu ...................... 396/55
7,475,484 B2 * 1/2009 Mogamiya .................... 33/1 M
2007/0297780 A1 * 12/2007 Enomoto ...................... 396/55
2008/0240704 A1 * 10/2008 Takahashi .................... 396/419
2009/0252484 A1 * 10/2009 Hasuda ........................ 396/55

FOREIGN PATENT DOCUMENTS

| JP | 7-5514 | 1/1995 |
| JP | 11-258678 | 9/1999 |
| JP | 2000-75338 | 3/2000 |
| JP | 2003-169236 | 6/2003 |
| JP | 2004-102089 | 4/2004 |

* cited by examiner

Primary Examiner—Christopher Mahoney
(74) Attorney, Agent, or Firm—Wenderoth, Lind & Ponack, L.L.P.

(57) ABSTRACT

An image blur correction device 400 includes a pitching movement frame 405, a yawing movement frame 408, and a third group frame 462. The pitching movement frame 405 supports a third lens group G3 included in an optical system for performing image blur correction. The yawing movement frame 408 supports the pitching movement frame 405 to be movable in the pitching direction perpendicularly intersecting a second optical axis A2, within a plane perpendicularly intersecting the second optical axis A2. The third group frame 462 supports the yawing movement frame 408 to be movable in the yawing direction along an arc whose center is a rotational axis A3, within a plane perpendicularly intersecting the second optical axis A2.

20 Claims, 22 Drawing Sheets

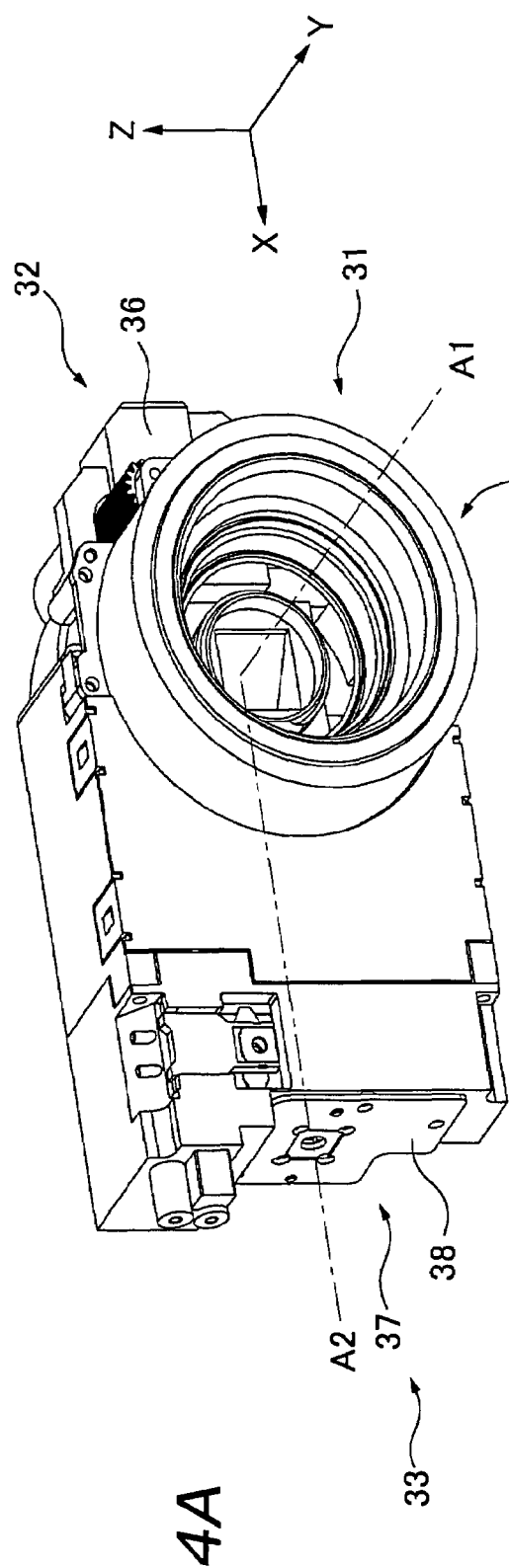
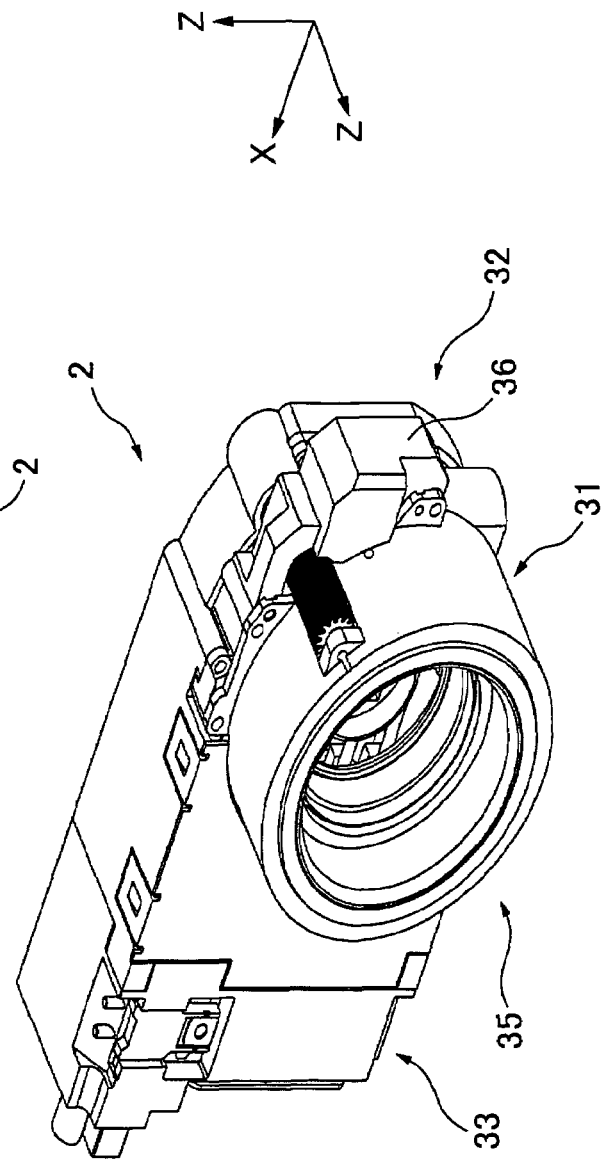
Fig. 4A
Fig. 4B

IMAGE BLUR CORRECTION DEVICE AND CAMERA

CROSS-REFERENCE TO RELATED APPLICATIONS

This application claims priority to Japanese Patent Application No. JP2006-031463 filed on Feb. 8, 2006. The entire disclosures of Japanese Patent Application No. JP2006-031463 is hereby incorporated herein by reference.

BACKGROUND OF THE INVENTION

1. Field of the Invention

The present invention relates to an image blur correction device and a camera, and more particularly relates to an image blur correction device that drives a correction lens and performs image blur correction, and to a camera equipped with this image blur correction device.

2. Description of the Related Art

Digital cameras that make use of image sensors such as a CCD (Charge Coupled Device) or CMOS (Complementary Metal Oxide Semiconductor) sensor to convert an optical image into an electrical signal, and record by digitizing the electrical signal, have become very popular in recent years. With these digital cameras, there is a need not only for increasing the number of pixels of the CCD or CMOS sensor, but also for improving the performance of the lens barrel that forms the optical image on these image sensors. More specifically, there is a need for a lens barrel equipped with a high-power zoom lens system.

Meanwhile, the housing of digital cameras needs to be made more compact in order to make these products more portable. To this end, there is a need for reduced size in an image pickup apparatus equipped with a lens barrel and image sensors, which is believed to contribute greatly to reducing the size of the housing. In these efforts to reduce the size of an image pickup apparatus, what is known as a folding optical system has been proposed, in which the apparatus is reduced in size by bending the zoom lens system at some point along the optical path, without changing the optical length.

For instance, Japanese published unexamined application JPH11-258678 discloses a folding optical system that uses a reflecting mirror to bend the optical path. More specifically, the lens barrel disclosed in JPH11-258678 is equipped with a first lens group and a second lens group, in that order from the subject side, on the subject side of the reflecting mirror, and is equipped with a third lens group and a fourth lens group, in that order from the reflecting mirror side, on the image sensor side of the reflecting mirror. The first lens group is fixed. The second and third lens groups are each movable in the optical axial direction, and a zoom lens system is constituted by the co-movement of these. The fourth lens group is used for focus adjustment.

Japanese published unexamined application JP2003-169236 discloses a folding optical system that uses a prism to bend the optical path. More specifically, the lens barrel disclosed in JP2003-169236 is equipped with a lens group on the subject side of the prism. The lens group is movable in the optical axial direction between a usage position and a storage position. The prism is also movable, so as to ensure enough room for the lens group when the lens group is in its storage position.

Japanese published unexamined application JP2004-102089 discloses a constitution of a lens group used in a folding optical system.

However, further improvement is necessary before the need for a higher-power zoom lens system and the need for a smaller size can both be realized at the same time.

More specifically, with the constitutions disclosed in JPH11-258678 and JP2003-169236 it is difficult to achieve a smaller apparatus size while at the same time configuring a high-power zoom lens system. Furthermore, even if the lens configuration disclosed in JP2004-102089 is employed, no constitution for reducing the apparatus size is disclosed, and the specific apparatus constitution is not clear.

Meanwhile, in general, when an image pickup apparatus is reduced in size, or is equipped with a high-power zoom lens system, there is a need to prevent blur of the captured image, the main cause of which is camera shake.

FIG. 20 is an exploded perspective view of an image blur correction device in an example of prior art (see Japanese published unexamined application JP2000-75338). With the image blur correction device shown in FIG. 20, a second lens group 101 is supported by a lens frame 102, and the lens frame 102 is movably supported by a guide shaft 103 that guides movement in the pitching and yawing directions. Also, the lens frame 102 is provided with coils 104a and 104b for driving the lens frame 102 in the pitching and yawing directions. Magnets 106a and 106b are provided to a stationary base 105, across from the coils 104a and 104b, respectively. When power is sent to the coils 104a and 104b, driving force is generated in the pitching and yawing directions, and the second lens group 101 is driven in each of these directions. The amount of blur of the lens barrel is detected by angular velocity sensors 107a and 107b, power is sent to the coils 104a and 104b according to the detection signal, and image blur is corrected.

The need for reduced size is still present even with an image pickup apparatus in which an image blur correction device is mounted. To meet this need, with conventional image blur correction device installed in an image pickup apparatus, there have been attempts at reducing the size in the optical axial direction of the light incident on the image blur correction device.

Meanwhile, it has become necessary to mount image blur correction device in various kinds of image pickup apparatus. In this case, to afford greater latitude in the design of the image pickup apparatus, not only does the size of the image blur correction device need to be reduced in the optical axial-direction, but the size in any direction perpendicularly intersecting the optical axis also needs to be reduced. For example, when the above-mentioned image blur correction device is installed in an image pickup apparatus having a folding optical system, if a conventional image blur correction device is installed on the side of the reflecting mirror or prism from which light exits, then the size of the image pickup apparatus increases in a direction perpendicular to the optical axis of the light incident on the image blur correction device. Specifically, the size (thickness) of the image pickup apparatus in the optical axial direction of the light incident on the reflecting mirror or prism increases. This is because with a conventional image blur correction device, two drive units for driving the correction lens (used to correct image blur) in the pitching and yawing directions are disposed 90 degrees apart and centering around the correction lens.

Also, as discussed above, with a conventional image blur correction device, the guide shaft 103 is provided so that the pitching movement frame and yawing movement frame can advance in the pitching and yawing directions. Accordingly, space is required for the installation of the guide shaft 103, and this makes it more difficult to reduce the size of the image blur correction device.

Also, reducing the size in any direction of an image pickup apparatus by installing an image blur correction device whose size has been reduced in any direction perpendicularly intersecting the optical axis is a way of increasing the consumer appeal of an image pickup apparatus, and not just an image pickup apparatus having a folding optical system.

In view of this, to further reduce the size of an image blur correction device, an image blur correction device has been proposed in which the correction lens is rotationally driven around a rotational axis disposed substantially parallel to the optical axis of the correction lens (see Japanese published unexamined application H7-5514 (FIGS. 6 and 8), for example). FIGS. 21 and 22 are exploded perspective views of an image blur correction device in an example of prior art.

The image blur correction device shown in FIG. 21 is mainly constituted by a support frame 15 to which a correction lens 16 is fixed, a support arm 13 that supports the support frame 15 so that it is capable of linear motion, and a barrel 11 that supports the support arm 13 to be rotatable. With this image blur correction device, the support arm 13 is rotationally driven along an arc whose center is a shaft 45a with respect to the barrel 11, by a coil 46a attached to the barrel 11 and a permanent magnet 45 attached to the support arm 13. The support frame 15 is driven in a direction perpendicularly intersecting the optical axis with respect to the support arm 13, by permanent magnets 47a and 47b attached to the support frame 15 and a coil 49 attached to the support arm 13. With this constitution, a correction lens 16 is movable in the pitching and yawing directions within a plane perpendicularly intersecting the optical axis.

The image blur correction device shown in FIG. 22 is mainly constituted by a support frame 15 to which a correction lens 16 is fixed, a support arm 13 that supports the support frame 15 to be rotatable and a barrel 11 that supports the support arm 13 so that it is capable of linear motion. With this image blur correction device, the support arm 13 is driven in a direction perpendicularly intersecting the optical axis with respect to the barrel 11, by a permanent magnet 63y attached to the barrel 11 and a coil 62y attached to the support arm 13. The support frame 15 is driven in a direction perpendicularly intersecting the optical axis with respect to the support arm 13, by a coil 62p attached to the support frame 15 and a permanent magnet 63p attached to the support arm 13. With this constitution, the correction lens 16 is movable in the pitching and yawing directions within a plane perpendicularly intersecting the optical axis.

With the image blur correction device shown in FIGS. 21 and 22, one support frame is driven along an arc whose center is the rotational axis. Accordingly, friction is reduced during drive of the support frame, and the drive unit having a coil and a permanent magnet can be smaller. Compared to the image blur correction device described in JPH11-258678, JP2003-169236, JP2004-102089, and JP2000-75338 above, one less guide shaft for linearly moving is needed. This allows the guide mechanism to be smaller. That is, the image blur correction device shown in FIGS. 21 and 22 allow a further reduction in size.

However, with the image blur correction device shown in FIGS. 21 and 22, there is the risk of a decrease in image blur correction performance. More specifically, with the image blur correction device shown in FIG. 21, the driving force for rotating the correction lens 16 acts on the support arm 13, but does not act directly on the support frame 15 to which the correction lens 16 is fixed. With the image blur correction device shown in FIG. 22, the driving force for linearly moving the correction lens 16 acts on the support arm 13, but does not act directly on the support frame 15 to which the correction lens 16 is fixed. Consequently, the lens support member may not be supported in the desired position, depending on the dimensional accuracy of the portion where the support arm 13 and the support frame 15 are linked. This poses the risk of a decrease in the positional accuracy of the correction lens.

Thus, when size is reduced, there is the risk of a decrease in the image blur correction performance.

Also, with the image blur correction device described in JPH11-258678, JP2003-169236, JP2004-102089, and JP2000-75338, the guide shaft is fixed adhesively, for example. Consequently, the manufacture of the image blur correction device entails the work of applying and drying an adhesive agent. As a result, the manufacture becomes more complicated, and this drives up the manufacturing cost.

SUMMARY OF THE INVENTION

An object of the present invention is to provide an image blur correction device that can be made smaller in size while preventing a decrease in image blur correction performance, and a camera equipped with this apparatus.

Another object of the present invention is to provide a method for manufacturing an image blur correction device with which a reduction in manufacturing cost can be achieved.

The image blur correction device according to the first invention is an apparatus for correcting the blur of an image caused by movement of a camera, comprising a lens support member, a first support member, a second support member, a drive unit for linearly driving, and a drive unit for rotationally driving. A correction lens included in an optical system for performing image blur correction is fixed to the lens support member. The first support member supports the lens support member to be movable in one direction selected from among a linear direction that is any direction within a plane perpendicularly intersecting the optical axis of light incident on the correction lens, and a rotational direction that follows an arc whose center is a rotational axis substantially parallel to the optical axis within the plane. The second support member supports the first support member to be movable in the other direction selected from among the linear and rotational directions. The drive unit for linearly driving imparts a driving force to the lens support member in order to drive the lens support member in the linear direction. The drive unit for rotationally driving imparts a driving force to the lens support member in order to drive the lens support member in the rotational direction.

With this image blur correction device, either the first support member rotates around a rotational axis with respect to the second support member, or the lens support member rotates around a rotational axis with respect to the first support member. There is therefore no need for a guide shaft corresponding to the rotational direction. As a result, this image blur correction device can be smaller in a direction perpendicular to the linear direction.

In addition, with this image blur correction device, driving force is directly imparted from the drive units for linearly driving and for rotationally driving to the lens support member to which the correction lens is fixed. This means that the decrease in the positional accuracy of the correction lens can be prevented better than when the driving force of the drive units does not act directly on the lens support member, so the resulting decrease in image blur correction performance can be prevented.

As a result, with this image blur correction device, a decrease in image blur correction performance can be prevented while still reducing the size.

The image blur correction device according to the second invention is the device according to the first invention, further comprising a rotational position detection element for detecting the position of the lens support member in the rotational direction. The drive unit for rotationally driving has a magnet for rotationally driving. The magnetic flux density distribution of the magnet for rotationally driving in the rotational direction includes a usable region for rotational position detection, in which the magnetic flux density varies at a substantially constant ratio. There exists a state in which, when viewed along the optical axis, the detection center of the rotational position detection element within the movable range of the lens support member coincides with the center line of the usable region for rotational position detection in the rotational direction.

As a result, the movable range of the detection center of the position detection element tends to fit within the usable region of the magnet, and a decrease in the position detection accuracy in the rotational direction can be prevented.

The image blur correction device according to the third invention is the device according to the second invention, wherein, when viewed along the optical axis, in a state in which the detection center of the rotational position detection element coincides with the center line of the usable region for rotational position detection in the rotational direction, the direction of the center line of the usable region for rotational position detection in the rotational direction substantially coincides with the linear direction.

In this case, when the lens support member is driven in the linear direction, misalignment is suppressed between the detection center of the rotational position detection element and the center line of the usable region for rotational position detection in the rotational direction. As a result, the movable range of the detection center of the position detection element tends to fit within the usable region of the magnet, and this prevents the decrease in position detection accuracy in the rotational direction that would accompany operation in the linear direction.

Here, "the center line of the usable region for rotational position detection in the rotational direction substantially coincides with the linear direction" encompasses a case in which the center line and the linear direction are misaligned in a state in which the movable range of the detection center of the position detection element is within the usable region of the magnet, as well as a case in which the center line completely coincides with the linear direction.

The image blur correction device according to the fourth invention is the device according to the second or third invention, wherein, when viewed along the optical axis, in a state in which the optical axis of light incident on the correction lens coincides with the center of the correction lens, the detection center of the rotational position detection element substantially coincides with the center line of the usable region for rotational position detection in the rotational direction.

In this case, in a state in which the optical axis of light incident on the correction lens coincides with the center of the correction lens, the movable range of the detection center of the position detection element tends to fit within the usable region of the magnet. Therefore, image blur correction can be performed over a range of high position detection accuracy in the rotational direction, and a decrease in image blur correction performance can be prevented.

Here, "the detection center of the rotational position detection element substantially coincides with the center line of the usable region for rotational position detection in the rotational direction" encompasses a case in which the detection center and the center line are misaligned in a state in which the movable range of the detection center of the position detection element is within the usable region of the magnet, as well as a case in which the detection center completely coincides with the center line.

The image blur correction device according to the fifth invention is the device according to any of the second to fourth inventions, wherein, when viewed along the optical axis, the rotational axis, the center of the correction lens, and the detection center of the rotational position detection element are disposed substantially on a straight line.

In this case, when the lens support member is driven in the linear direction, misalignment is suppressed between the detection center of the rotational position detection element and the center line of the usable region for rotational position detection in the rotational direction. As a result, the movable range of the detection center of the position detection element tends to fit within the usable region of the magnet, and this prevents a decrease in position detection accuracy in the rotational direction.

Here, "the rotational axis, the center of the correction lens, and the detection center of the rotational position detection element are disposed substantially on a straight line" encompasses a case in which the rotational axis, the optical axis center, and the detection center are misaligned in a state in which the movable range of the detection center of the position detection element is within the usable region of the magnet, as well as a case in which the rotational axis, the optical axis center, and the detection center are disposed on a straight line.

The image blur correction device according to the sixth invention is the device according to any of the first to fifth inventions, further comprising a linear position detection element for detecting the position of the lens support member in the linear direction. When viewed along the optical axis, a line segment connecting the rotational axis and the detection center of the linear position detection element substantially coincides with the linear direction.

In this case, in a state in which the optical axis of light incident on the correction lens coincides with the center of the correction lens, the movable range of the detection center of the position detection element tends to fit within the usable region of the magnet. Therefore, image blur correction can be performed over a range of high position detection accuracy in the linear direction, and a decrease in position detection accuracy can be prevented.

Here, "a line segment connecting the rotational axis and the detection center of the linear position detection element substantially coincides with the linear direction" encompasses a case in which the line segment and the linear direction are misaligned in a state in which the movable range of the detection center of the position detection element is within the usable region of the magnet, as well as a case in which the line segment completely coincides with the linear direction.

The image blur correction device according to the seventh invention is the device according to any of the first to fifth inventions, further comprising a linear position detection element for detecting the position of the lens support member in the linear direction. The drive unit for linearly driving has a magnet for linearly driving. The magnetic flux density distribution of the magnet for linearly driving in the linear direction includes a usable region for linear position detection, in which the magnetic flux density varies at a substantially constant ratio. There exists a state in which, when viewed along the optical axis, the detection center of the linear position detection element within the movable range of the lens support member coincides with the center line of the usable region for linear position detection in the linear direction.

As a result, the movable range of the detection center of the position detection element tends to fit within the usable region of the magnet, and a decrease in position detection accuracy in the linear direction can be prevented.

The image blur correction device according to the eighth invention is the device according to the seventh invention, wherein, when viewed along the optical axis, in a state in which the optical axis of light incident on the correction lens coincides with the center of the correction lens, the detection center of the linear position detection element substantially coincides with the center line of the usable region for linear position detection in the linear direction.

In this case, when the lens support member is driven in the rotational direction, misalignment is suppressed between the detection center of the linear position detection element and the center line of the usable region for linear position detection in the linear direction. As a result, the movable range of the detection center of the position detection element tends to fit within the usable region of the magnet, and this prevents a decrease in position detection accuracy in the linear direction.

Here, "the detection center of the linear position detection element substantially coincides with the center line of the usable region for linear position detection in the linear direction" encompasses a case in which the detection center and the center line are misaligned in a state in which the movable range of the detection center of the position detection element fits within the usable region of the magnet, as well as a case in which the detection center completely coincides with the center line.

The image blur correction device according to the ninth invention is the device according to any of the first to eighth inventions, wherein the drive unit for rotationally driving has a magnet for rotationally driving and a coil for rotationally driving disposed across from the magnet for rotationally driving. When viewed along the optical axis, the distance between the rotational axis and the center of the coil for rotationally driving is longer than the distance between the rotational axis and the center of the correction lens.

The correction lens is generally heavier than the lens support member or the first support member. Therefore, the center of gravity of the movable portion of the image blur correction device is closer to the center of the correction lens.

The center of the coil for rotationally driving can be considered the load generation point of the drive unit for rotationally driving. Here, the distance between the rotational axis and the load generation point of the drive unit for rotationally driving is longer than the distance between the rotational axis and the center of the correction lens. Therefore, the lens support member can be driven with a smaller driving force, and the drive unit for rotationally driving can be smaller and more energy efficiency.

The image blur correction device according to the tenth invention is the device according to any of the first to eighth inventions, wherein the drive unit for rotationally driving has a magnet for rotationally driving and a coil for rotationally driving disposed across from the magnet for rotationally driving. When viewed along the optical axis, the distance between the rotational axis and the detection center of the rotational position detection element is shorter than the distance between the rotational axis and the center of the coil for rotationally driving.

In this case, the movable range of the rotational position detection element in the rotational direction is smaller. As a result, the movable range of the detection center of the rotational position detection element tends to fit within the usable region of the magnet, and this prevents a decrease in position detection accuracy in the rotational direction.

The image blur correction device according to the eleventh invention is the device according to any of the first to tenth inventions, wherein the rotational axis is disposed in a region between the drive unit for linearly driving and the correction lens.

The portion of the lens support member to which the correction lens is fixed must be strong enough to support the correction lens. Therefore, a portion of the lens support member will always be present around the periphery of the correction lens.

On the other hand, if the rotational axis is disposed on the opposite side of the drive unit for linearly driving from the correction lens, the external size of the device will be larger by an amount corresponding to the portion of the rotational axis formed from the drive unit for linearly driving.

Here, the rotational axis is disposed in a region between the drive unit for linearly driving and the correction lens. Therefore, the space around the correction lens can be used for effectively, and the size of the device can be reduced.

The image blur correction device according to the twelfth invention is the device according to any of the first to eleventh inventions, further comprising a linear position detection element for detecting the position of the lens support member in the linear direction. The drive unit for linearly driving has a magnet for linearly driving and a coil for linearly driving disposed across from the magnet for linearly driving. The distance between the rotational axis and the detection center of the linear position detection element is shorter than the distance between the rotational axis and the center of the coil for linearly driving.

In this case, the movable range of the linear position detection element in the rotational direction is smaller. As a result, the movable range of the detection center of the linear position detection element tends to fit within the usable region of the magnet, and this prevents a decrease in position detection accuracy in the linear direction.

The image blur correction device according to the thirteenth invention is the device according to any of the first to twelfth inventions, further comprising a flexible printed circuit board electrically connected to the drive unit for rotationally driving in order to supply voltage to the drive unit for rotationally driving. The flexible printed circuit board has a first fixed portion that is fixed to the lens support member, a second fixed portion that is fixed to the second support member, and a flexible portion that links the first and second fixed portions and is bendable. The flexible portion is disposed on the rotational axis side of the correction lens.

In this case, there is less deformation of the flexible portion when the lens support member moves in the rotational direction, and this prevents disconnection of the flexible printed circuit board. Also, if there is less deformation of the flexible portion, the driving force is smaller when the lens support member is driven in the rotational direction. This reduces the power consumption by the image blur correction device.

The image blur correction device according to the fourteenth invention is the device according to any of the first to thirteenth inventions, wherein the correction lens is disposed in a region between the drive unit for rotationally driving and the drive unit for linearly driving.

In this case, when viewed along the optical axis, the drive units for rotationally driving and for linearly driving are disposed on both sides of the correction lens. Accordingly, the image blur correction device becomes longer in roughly one direction. Put another way, the dimension is shorter in the direction perpendicular to the direction in which the device is longer.

The image blur correction device according to the fifteenth invention is the device according to any of the first to fourteenth inventions, further comprising at least three support portions. The support portions support a rotary member so as to be movable in a plane perpendicularly intersecting the optical axis with respect to a rotary support member, and limit relative movement between the rotary member and the rotary support member to both sides along the optical axis. The rotary member is one of the first and second support members and is movably supported in the rotational direction. The rotary support member is one of the lens support member and the first support member and supports the rotary member.

This prevents the lens support member from moving in the optical axis direction when the lens support member is driven, and prevents a decrease in optical performance, such as when the subject is out of focus.

The image blur correction device according to the sixteenth invention is the device according to the fifteenth invention, wherein each of the at least three support portions has a first support portion formed on the rotary member, and a second support portion that is formed on the rotary support member and can be engaged with the first support portion in a direction perpendicular to the rotational axis. One of the first and second support portions is a rod-shaped body. The other of the first and second support portions is an approximately U-shaped body that is engaged with the rod-shaped body.

In this case, movement of the rotary member along the optical axis with respect to the rotary support member can be restricted with a simple configuration.

The camera according to the seventeenth invention comprises a first lens group, a folding optical system, a second lens group, the image blur correction device according to any of the first to sixteenth inventions, an imaging unit, a lens barrel, and a case. The first lens group takes in light along a first optical axis. The folding optical system bends light incident along the first optical axis, along a second optical axis that intersects the first optical axis. The second lens group includes a correction lens for correcting image blur, and takes in light bent by the folding optical system. The imaging unit receives light that has passed through the second lens group. In the lens barrel are disposed the first lens group, the folding optical system, the second lens group, the image blur correction device, and the imaging unit. The case supports the lens barrel.

Here, the phrase "along a first optical axis" means parallel to the first optical axis, for example. The phrase "along a second optical axis" means parallel to the second optical axis, for example. The folding optical system includes, for example, members having a reflecting face, and more specifically, may include a prism, mirror, etc. The imaging unit may be a CCD, CMOS, or the like that receives light electrically, but is not limited to these, and may be a film or the like.

Because this camera is equipped with the image blur correction device according to any of the first to sixteenth inventions, a decrease in image blur correction performance is prevented while the size can be reduced. Specifically, with this camera a high-quality image can be obtained in which image blur has been corrected.

The camera according to the eighteenth invention is the camera according to the seventeenth invention, wherein the linear direction is substantially parallel to a direction perpendicularly intersecting the first and second optical axis.

In this case, the size can be reduced along the first optical axis of the camera. In particular, with this camera, a folding optical system is employed and an image blur correction device that is reduced in size in a direction perpendicularly intersecting the linear direction is installed. This makes it possible to reduce the size of the camera along the first optical axis (the thickness of the camera).

The manufacturing method according to the nineteenth invention is the method for manufacturing an image blur correction device having a lens support mechanism for supporting a correction lens included in an optical system for correcting image blur, and a rotary support member for supporting the lens support mechanism to be movable in the rotational direction along an arc whose center is a rotational axis substantially parallel to the optical axis, within a plane perpendicularly intersecting the optical axis of light incident on the correction lens. This manufacturing method comprises moving a member on the lens support mechanism side in a direction perpendicularly intersecting the rotational axis with respect to the rotary support member, and attaching a shaft member for rotatably linking the member on the lens support mechanism side and the rotary support member, to the rotary support member and the member on the lens support mechanism side.

With this manufacturing method, the image blur correction device is easier to assemble than when the member corresponding to the support component is attached after the shaft member has been attached. This affords a reduction in manufacturing cost.

Here, the phrase "lens support mechanism" means at least one member supporting the correction lens. Therefore, examples of this "lens support mechanism" include a mechanism for supporting the correction lens so that it is capable of linear movement, and a single member to which the correction lens is fixed.

The manufacturing method according to the twentieth invention is the manufacturing method according to the nineteenth invention, wherein, in the attachment of the shaft member, the shaft member is press-fitted into either a first hole provided in the member on the lens support mechanism side, or a second hole provided in the rotary support member.

In this case, there is no need for adhesive fixing as with a conventional guide shaft. This eliminates the bonding step and reduces the manufacturing cost.

The terms used above will now be described.

The "detection center of the position detection element" is an imaginary point at which it can be thought that the position detection element is disposed at one point in position detection. Examples of the detection center include the point at which detection sensitivity of the position detection element is at its maximum. In general, the detection center can be assumed to be the center point of the detection face of the position detection element.

When the magnet has undergone dipole magnetization, for example, the "usable region" means the range over which performance can be ensured such that the magnetic flux density changes at a substantially constant rate, centered around a polarization line between the N and S poles. Therefore, the "center line of the usable region" means the boundary at which polarity changes between the N and S poles when the magnet has undergone dipole magnetization. The state of the magnet encompasses a case in which the N pole portion is physically separated from the S pole portion, as well as a case in which the N pole portion and the S pole portion are physically integrated.

The "center of the coil" means the center as determined from the external shape of the coil, and when the coil is substantially quadrangular, for example, this means the center of that quadrangle.

Examples of a position detection element include a magnetic sensor that makes use of a hole effect (hole element).

BRIEF DESCRIPTION OF THE DRAWINGS

Referring now to the attached drawings which form a part of this original disclosure:

FIG. 4A, 4B are perspective views of the assembly of the image pickup apparatus.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment (1) Summary

A first embodiment of the present invention will be described through reference to FIGS. 1 to 17.

The main characteristic of the digital camera of the present invention lies in the constitution of its image blur correction device. The digital camera according to this embodiment employs a folding optical system for its optical system, and the lens barrel on the subject side is formed so that it can be advanced in multiple stages. This affords a high-power zoom lens system, and also makes the apparatus more compact. A camera equipped with the image blur correction device according to the present invention is not limited to this configuration, however, and the image blur correction device according to the present invention can also be mounted in a camera that does not have a folding optical system.

(2) Digital Camera

The digital camera of the first embodiment of the present invention will be described through reference to FIGS. 1 to 3.

(2.1) Constitution of Digital Camera

Figure 1:
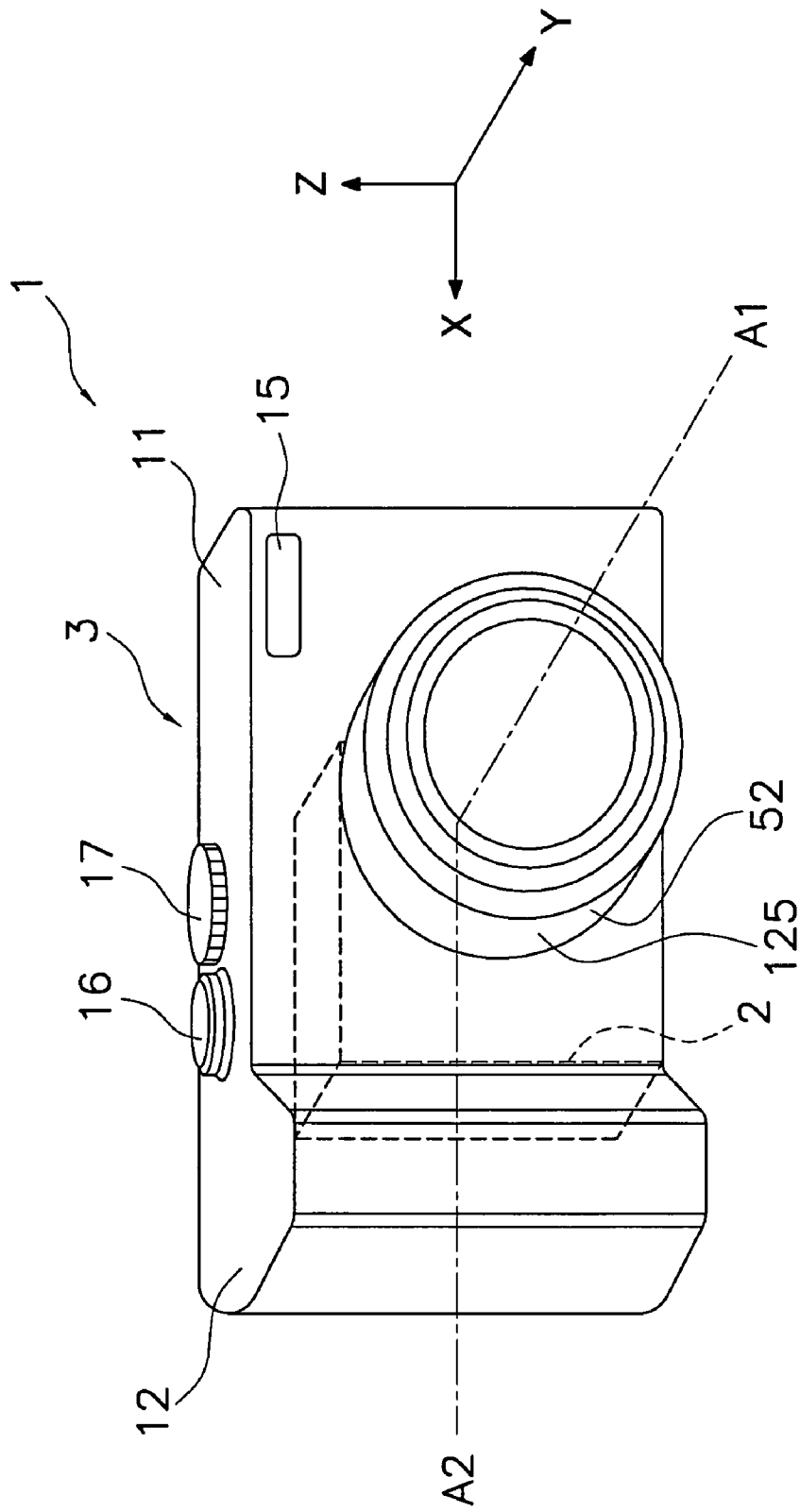
FIG. 1 is a perspective view of the outside of a digital camera.

FIG. 1 is a perspective view of the outside of a digital camera 1 as the first embodiment of the present invention.

The digital camera 1 has an image pickup apparatus 2 and a main body 3. The image pickup apparatus 2 includes a folding optical system that bends a light flux incident along a first optical axis A1, along a second optical axis A2 perpendicularly intersecting the first optical axis A1, and conducts the light to an image sensor. The main body 3 houses the image pickup apparatus 2 and performs control of the image pickup apparatus 2 and so forth.

First, before describing the detailed constitution of the image pickup apparatus 2, we will describe the constitution of the main body 3.

In the following description, the six sides of the digital camera 1 are defined as follows.

The side facing the subject during image capture with the digital camera 1 is termed the front side, while the opposite side is termed the rear side. When image capture is performed such that the vertical top and bottom of the subject coincide with the top and bottom in the short side direction of the rectangular image captured with the digital camera 1 (the aspect ratio (ratio of long side to short side) is generally, 3:2, 4:3, 16:9, etc.), the side facing upward in the vertical direction is termed the top side, and the opposite side is termed the bottom side. Furthermore, when image capture is performed such that the vertical top and bottom of the subject coincide with the top and bottom in the short side direction of the rectangular image captured with the digital camera 1, the side on the left as viewed from the subject side is termed the left side, and the opposite side is termed the right side. The above definitions do not limit the orientation in which the digital camera 1 is used.

Based on the above definitions, FIG. 1 is a perspective view of the front, top, and left sides.

In addition to the six sides of the digital camera 1, the six sides of the various constituent components disposed in the digital camera 1 are similarly defined. That is, the above definitions are applied to the six sides of the various constituent components in a state of being disposed in the digital camera 1.

Also, as shown in FIG. 1, there is defined a three-dimensionally intersecting coordinate system (right-handed system) having a Y axis parallel to the first optical axis A1 and an X axis parallel to the second optical axis A2. Under this definition, the direction facing from the rear side toward the front side along the first optical axis A1 is the Y axis positive direction, the direction facing from the right side toward the left side along the second optical axis A2 is the X axis positive direction, and the direction facing from the bottom side toward the top side along a perpendicular axis perpendicularly intersecting the first optical axis A1 and the second optical axis A2 is the Z axis positive direction.

This XYZ coordinate system will be used as a reference in the description of the drawings that follows. Specifically, the X axis positive direction, Y axis positive direction, and Z axis positive direction all reference to the same respective directions in each of the drawings.

(2.2) Constitution of Main Body

The constitution of the main body 3 will be described through reference to FIG. 1, FIG. 2, and FIGS. 3a to 3c.

Figure 2:
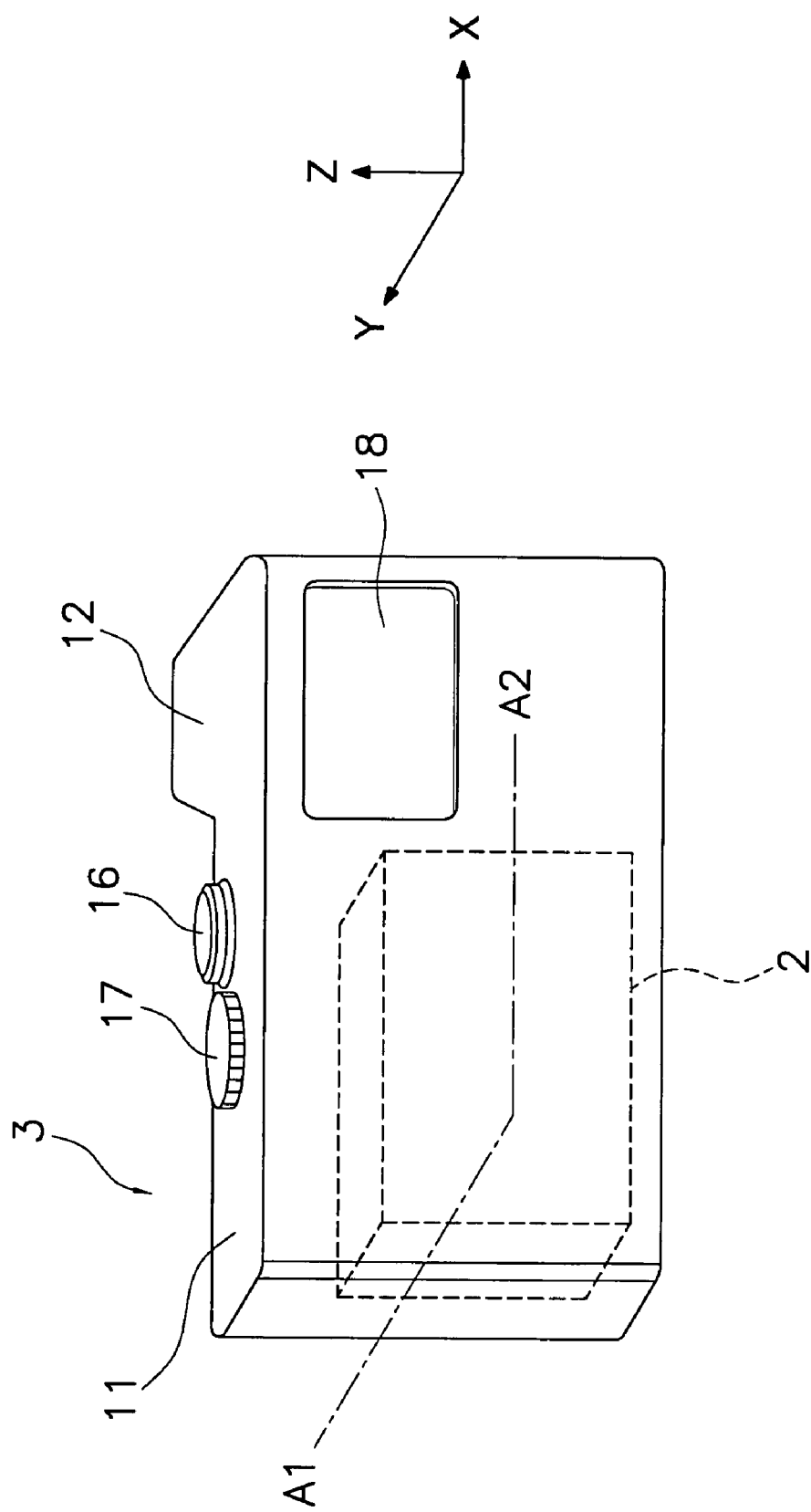
FIG. 2 is a perspective view of the outside of a digital camera.

FIG. 2 is a perspective view showing the outside of the rear side, top side and right side of the digital camera 1.

Figure 3A:
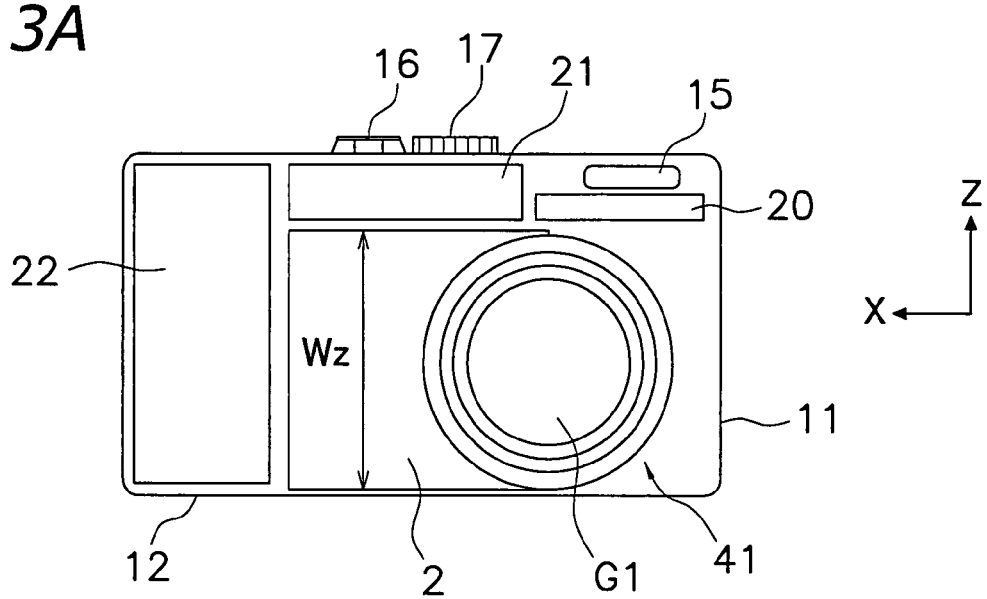
FIGS. 3A, 3B, 3C are see-through views schematically illustrating the constitution of the main body.
Figure 3B:
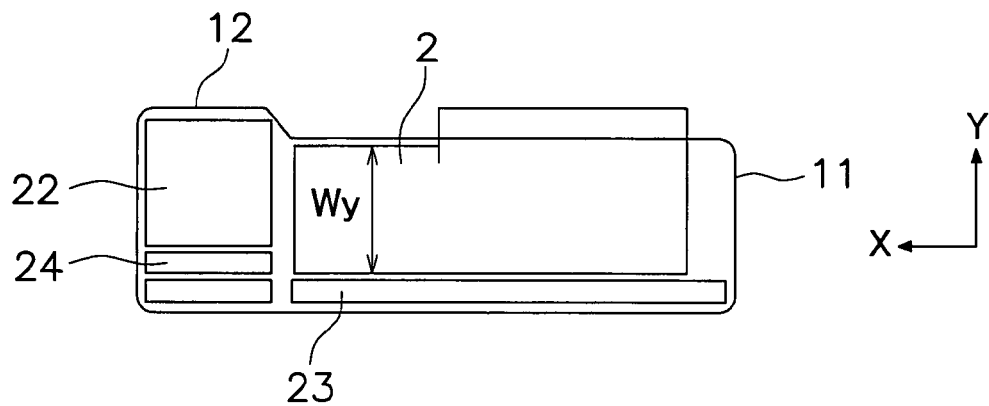
Figure 3C:
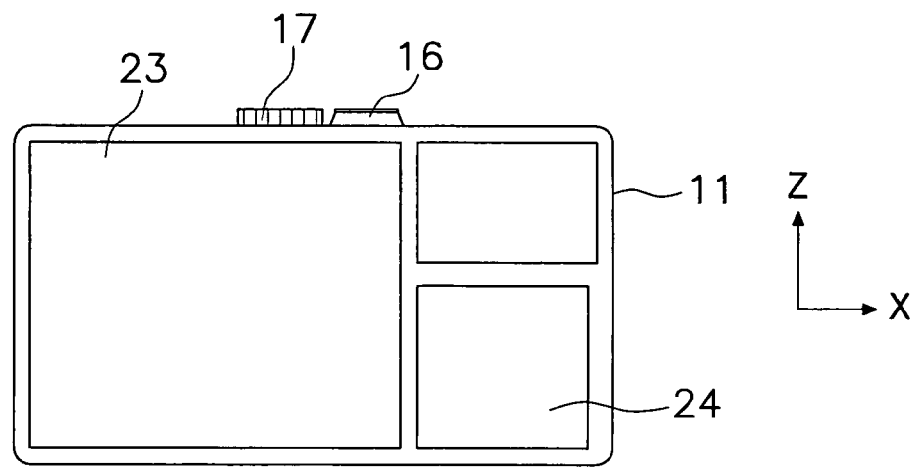

FIGS. 3a to 3c are see-through views schematically illustrating the constitution of the main body 3. FIG. 3A is a see-through view illustrating the constitution of the members disposed on the Y axial direction positive side (front side), FIG. 3B is a see-through view illustrating the constitution of the members disposed on the Z axial direction negative side (bottom side), and FIG. 3C is a see-through view illustrating the constitution of the members disposed on the Y axial direction negative side (rear side).

As shown in FIGS. 1 to 3, the main body 3 is primarily made up of a case 11 and a grip component 12 that constitute the housing in which the image pickup apparatus 2 is housed; a strobe 15, release button 16, control dial 17, and image display 18 disposed on the surface of the case 11; and a main capacitor 20, sub-circuit board 21, battery 22, main circuit board 23, and memory card 24 that are disposed on the inside of the housing made up of the case 11 and the grip component 12.

As shown in FIG. 1, the case 11 is a substantially rectangular housing that is longer in the second optical axis A2, and the grip component 12, which is grasped by the user when taking a photograph, is disposed protruding from the case 11 in the Y axial direction on the X axial direction positive side. As a result, the case 11 and the grip component 12 constitute a hollow housing that is substantially L-shaped. A fixed frame 52 (see FIG. 6) of the image pickup apparatus 2 (discussed below) has a cylindrical portion 125 (see FIG. 6), part of which protrudes from the case 11 on the Y axial direction positive side. The strobe 15 is disposed on the front side of the case 11. The strobe 15 aids in exposure by flashing and illuminating the subject as needed, such as when the subject is dark. The release button 16 and the control dial 17 are disposed on the grip component 12 side on the top side of the case 11. The release button 16 is pressed toward the Z axial direction negative side when an image capture operation is executed. The control dial 17 is used to make various settings, such as setting an image capture operation.

As shown in FIG. 2, the image display 18 is provided on the rear side of the case 11 as a means for allowing the user, etc., to visually check the image being captured by the image pickup apparatus 2. The image display 18 has, for example, a rectangular external shape with an aspect ratio (ratio of long side to short side) of 3:2, 4:3, 16:9, etc., and is provided such that its long side direction is substantially parallel to the direction along the second optical axis A2 (the X axial direction).

FIGS. 1 and 2 show just the main members disposed on the surface of the case 11, and other members besides those described may also be provided.

Next, the internal constitution of the main body 3 will be described through reference to FIG. 3.

As shown in FIG. 3A, the image pickup apparatus 2, which is longer in the second optical axis A2 direction (the X axial direction positive side), is disposed, with its longitudinal direction matched to the longitudinal direction of the case 11, on the Y axial direction positive side inside the main body 3. The image pickup apparatus 2 is disposed in the main body 3 with a first group frame unit 41, which supports a first lens group G1 facing the subject, on the X axial direction negative side. This ensures enough X axial direction distance from the first lens group G1 to the grip component 12.

The strobe 15, the main capacitor 20, and the sub-circuit board 21 are disposed on the Z axial direction positive side of the image pickup apparatus 2. The main capacitor 20 imparts flash energy to the strobe 15 by means of charging from the battery 22 (discussed below). The sub-circuit board 21 transforms the power from the battery 22 (discussed below) as needed, and controls the strobe 15. The battery 22 is disposed as a power source for actuating the digital camera 1 on the Y axial direction positive side inside the grip component 12.

As shown in FIGS. 3b and 3c, the main circuit board 23 is disposed on the Y axial direction negative side of the image pickup apparatus 2. An image processing circuit for processing image signals from the image pickup apparatus 2, a control circuit for controlling the image pickup apparatus 2, and the like are mounted on the main circuit board 23. The memory card 24 is disposed on the Y axial direction negative side of the battery 22. The memory card 24 records image signals from the image pickup apparatus 2.

As shown in FIGS. 3a and 3b, the image pickup apparatus 2 is formed so that its Z axial direction width (Wz) is greater than its Y axial direction width (Wy).

(3) Image Pickup Apparatus (3.1) Constitution of Image Pickup Apparatus

The constitution of the image pickup apparatus 2 mounted in the digital camera 1 will be described through reference to FIG. 4.

FIG. 4 consists of perspective views of the assembly of the image pickup apparatus 2. FIG. 4A is an perspective view of the front side, top side, and left side of the image pickup apparatus 2, while FIG. 4B is an perspective view of the front side, top side, and right side of the image pickup apparatus 2.

The image pickup apparatus 2 is constituted by a lens barrel 31 having an optical system 35, a motor unit 32 having a zoom motor 36 that drives the lens barrel 31, and a CCD unit 33 having a CCD 37 as an imaging unit that receives the light flux that has passed through the lens barrel 31.

The lens barrel 31 is mechanically characterized by having a multi-stage retractable lens frame that can be advanced and retracted in multiple stages in the first optical axis A1 direction, and is optically characterized by having the optical system 35 that constitutes a folding optical system. The optical system 35 is equipped with 12 optical elements in 5 groups (lenses and prisms) that provide a high-power zoom greater than an optical 3× zoom (such as an optical zoom of about 6× to 12×). With this constitution, the lens barrel 31 takes in the light flux incident along the first optical axis A1, bends the light flux incident along the first optical axis A1 in a direction along the second optical axis A2 intersecting with the first optical axis A1, and guides the light flux bent in a direction along the second optical axis A2 to the CCD 37.

The motor unit 32 mainly has the zoom motor 36 (such as a DC motor), a flexible printed circuit board (FPC; not shown) that electrically connects the zoom motor 36 to the main circuit board 23 (see FIG. 3), and a photosensor (not shown) provided for measuring the position from the origin point of the lens in the lens barrel 31, through measuring the rotational speed of the zoom motor 36. The zoom motor 36 drives the lens barrel 31 and moves the optical system 35 between a wide angle end and a telephoto end. As a result, the optical system 35 provided to the lens barrel 31 operates as a zoom lens system that varies the imaging magnification of the light flux in the CCD 37. The photosensor operates as follows. This photosensor includes a pair of transmissive photosensors provided farther in from the outside of a motor box (gearbox). The photosensor has an open box section external shape, and a pair of a light emitting element and a light receiving element is provided at the two opposing ends. A gear that directly couples to the zoom motor 36 passes between the light emitting element and the light receiving element, and the number of times the gear goes back and forth between the light emitting element and the light receiving element per unit time is counted, which allows the rotational speed of the zoom motor to be measured in non-contact fashion.

The CCD unit 33 mainly has the CCD 37 that receives the light flux that has passed through the lens barrel 31 and converts it into an electrical signal, a CCD plate 38 for fixing the CCD 37 to the lens barrel 31, and an FPC (not shown) that electrically connects the CCD 37 to the main circuit board 23 (see FIG. 3).

(3.2) Optical System

Before the detailed constitution of the image pickup apparatus 2 is described, the constitution of the optical system 35 provided to the lens barrel 31 will be described through reference to FIG. 5.

Figure 5:
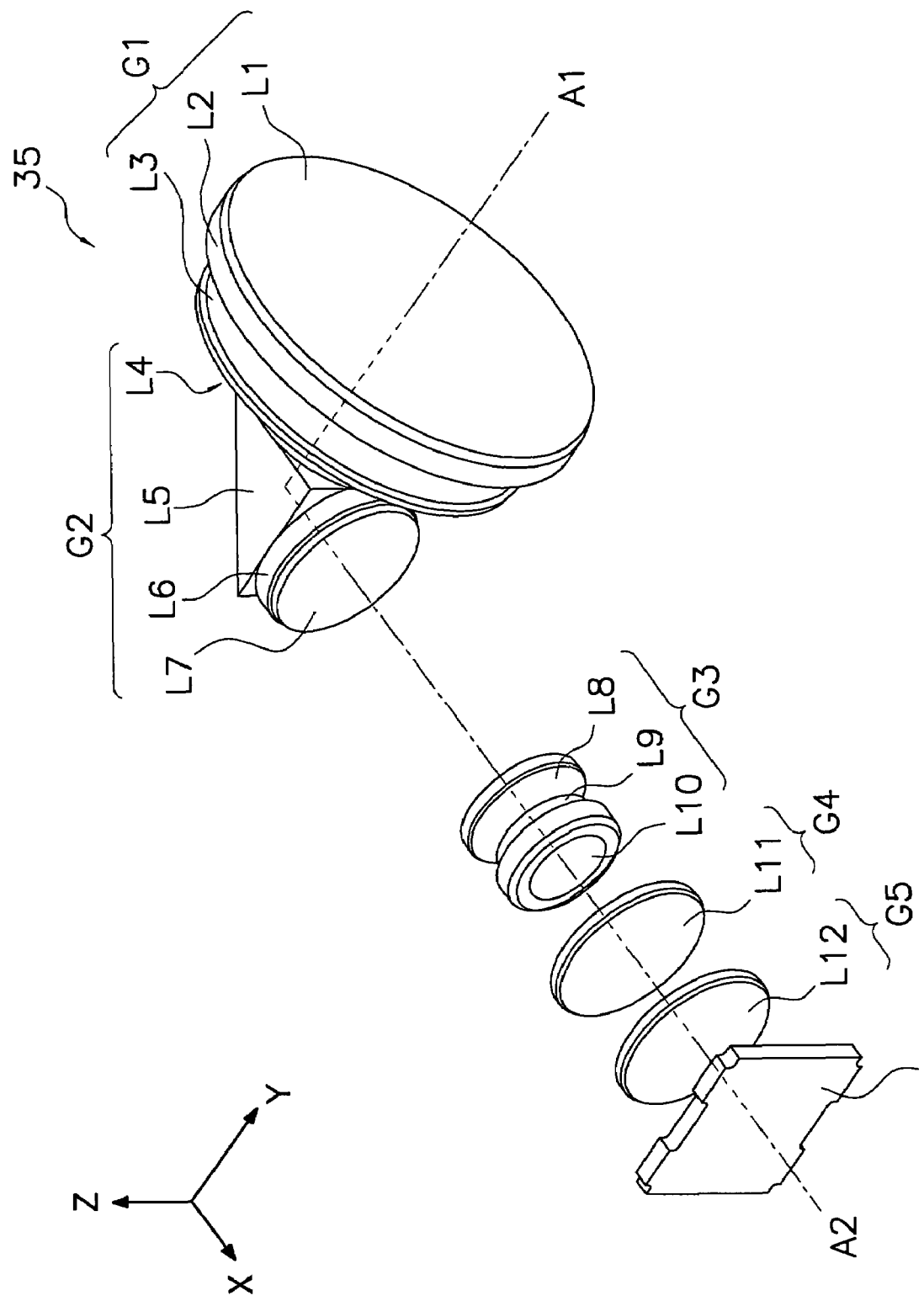
FIG. 5 shows the constitution of the optical system (wide angle end).

FIG. 5 shows the constitution of the optical system 35 provided to the lens barrel 31. FIG. 5 shows the disposition of the optical system 35 when the optical system 35 is located at the wide angle end. FIG. 5 shows the disposition of the optical system 35 as seen from the same viewpoint as in FIG. 4.

As shown in FIG. 5, the optical system 35 is made up of the first lens group G1, the second lens group G2, an exposure adjustment member St (see FIG. 6), a third lens group G3 as a correction lens, a fourth lens group G4, a fifth lens group G5, and an IR filter F1 (not shown), in that order from the subject side, and is constituted such that the light flux incident from the first lens group G1 passes through the lens groups G1 to G5 and the IR filter F1 and is guided to the CCD 37. The lens groups G1 to G5 constitute a zoom lens system by varying the spacing between the lens groups.

The constitution of the lenses that make up the lens groups G1 to G5 is not limited to the above, and another lens constitution can be employed as long as it exhibits the same optical effect.

(4) Lens Barrel (4.1) Constitution of Lens Barrel

The constitution of the image pickup apparatus 2, and mainly the constitution of the lens barrel 31, will be described through reference to FIG. 6.

Figure 6:
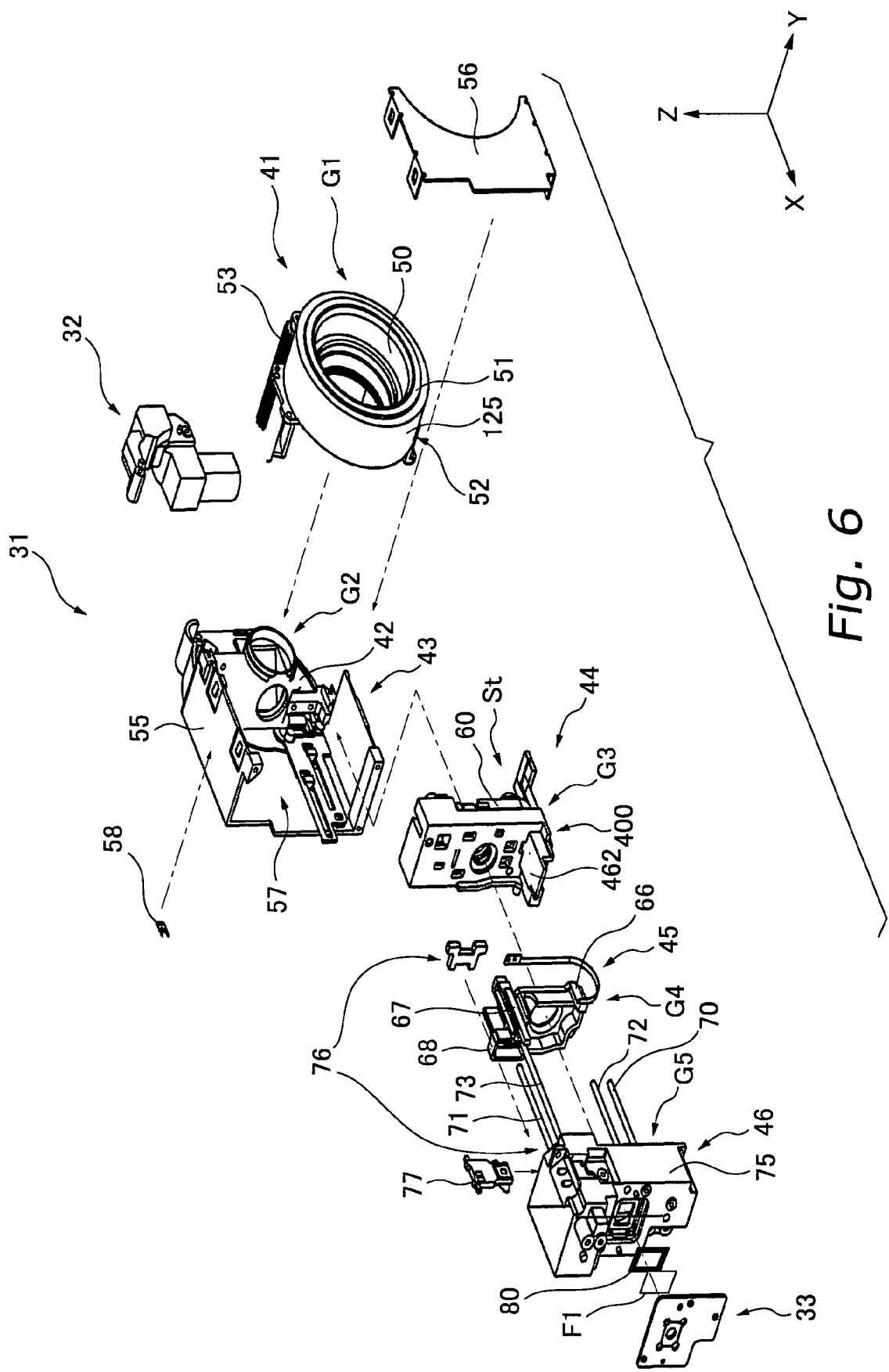
FIG. 6 is an exploded perspective view of the image pickup apparatus.

FIG. 6 is an exploded perspective view of the image pickup apparatus 2 when seen from the same viewpoint as in FIG. 4A.

The lens barrel 31 is constituted by a first group frame unit 41 that supports the first lens group G1, a base unit 43 to which is fixed a second group frame unit 42 that supports the second lens group G2, a third group frame unit 44 that holes the exposure adjustment member St and the third lens group G3, a fourth group frame unit 45 that holds the fourth lens group G4, and a master flange unit 46 that holds the fifth lens group G5.

The first group frame unit 41 mainly has the first lens group G1 disposed on the first optical axis A1, a first group frame 50 that holds the first lens group G1, a drive frame 51 that supports the first group frame 50 to be movable in the first optical axis A1 direction (Y axial direction), a fixed frame 52 that supports the drive frame 51 to be movable in the first optical axis A1 direction (Y axial direction), and a drive gear 53 that is disposed to be movable in the Y axial direction between the fixed frame 52 and the base unit 43, and transmits the driving force of the motor unit 32 to the drive frame 51.

The fixed frame 52 is fixed to the second group frame unit 42 that supports the second lens group G2. In this fixing, the Z axial direction and the X axial direction are positioned so that the optical axis of the first lens group G1 will coincide with the optical axis of the fourth lens L4 of the second lens group G2.

The base unit 43 mainly has a base 55 that constitutes part of the housing of the lens barrel 31; a cover 56 that constitutes the housing along with the base 55 and covers the front side of the base 55; the second group frame unit 42 that is fixed to the base 55; a third group movement mechanism 57 that moves the third group frame unit 44, which is held inside the housing constituted by the base 55 and the cover 56, in the second optical axis A2 direction (X axial direction); and a photosensor 58 that detects the X axial direction position of the third group frame unit 44.

The motor unit 32 that rotationally drives the drive gear 53 is attached on the X axial direction negative side of the base unit 43. The driving force of the motor unit 32 is transmitted through the drive gear 53 to the third group movement mechanism 57. The master flange unit 46 that covers the X axial direction positive side of the base unit 43 is fixed on the X axial direction positive side of the base unit 43.

The third group frame unit 44 mainly has a shutter unit 60 that is provided on the second optical axis A2 and is equipped with the exposure adjustment member St, which performs shutter operation and diaphragm operation, the third lens group G3, an image blur correction device 400 that supports the third lens group G3 to be movable in the Y axial direction and the Z axial direction, and a third group frame 462 that supports the shutter unit 60 and the image blur correction device 400.

The third group frame 462 is fixed to the third group movement mechanism 57 of the base unit 43, and is driven in the X axial direction. In this fixing, the Y axial direction and the Z axial direction are positioned so that the optical axis when the third lens group G3 is located at the movable center of its movable range will coincide with the optical axis of the sixth lens L6 and the seventh lens L7 of the second lens group G2. Furthermore, the third group frame 462 is slidably mated to third group guide poles 70 and 71 extending to the X axial direction negative side from the master flange unit 46 (discussed below). This allows the third group frame unit 44 to move in only the X axial direction, that is, in the second optical axis A2 direction.

The fourth group frame unit 45 mainly has the fourth lens group G4, a fourth group frame 66 that supports the fourth lens group Q4, and a sensor magnet 67 and coil 68 that are fixed to the fourth group frame 66.

The fourth group frame 66 is slidably mated to fourth group guide poles 72 and 73 extending to the X axial direction negative side from the master flange unit 46 (discussed below). As a result, the fourth group frame 66 is positioned in the Y axial direction and the Z axial direction such that the optical axis of the fourth lens group G4 will coincide with the optical axis of the sixth lens L6 and seventh lens L7 of the second lens group G2, and is movable only in the X axial direction, that is, in the second optical axis A2 direction.

The master flange unit 46 mainly has a fifth lens group G5, a master flange 75 that supports the fifth lens group G5, the third group guide poles 70 and 71 and the fourth group guide poles 72 and 73 that are fixed to the master flange 75 and extend to the X axial direction negative side, the IR filter F1 attached from the X axial direction positive side via a rubber gasket 80, a magnetic member 76 that generates drive in the fourth group frame unit 45 in conjunction with the coil 68, and an MR sensor 77 that senses the X axial direction position of the fourth group frame unit 45 by detecting the magnetism of the sensor magnet 67.

The master flange 75 is fixed on the X axial direction positive side of the base 55. In this fixing, the Y axial direction and the Z axial direction are positioned so that the optical axis of the fifth lens group G5 will coincide with the optical axis of the sixth lens L6 and seventh lens L7 of the second lens group G2. Furthermore, the CCD unit 33 is fixed on the X axial direction positive side of the master flange unit 46.

Figure 7:
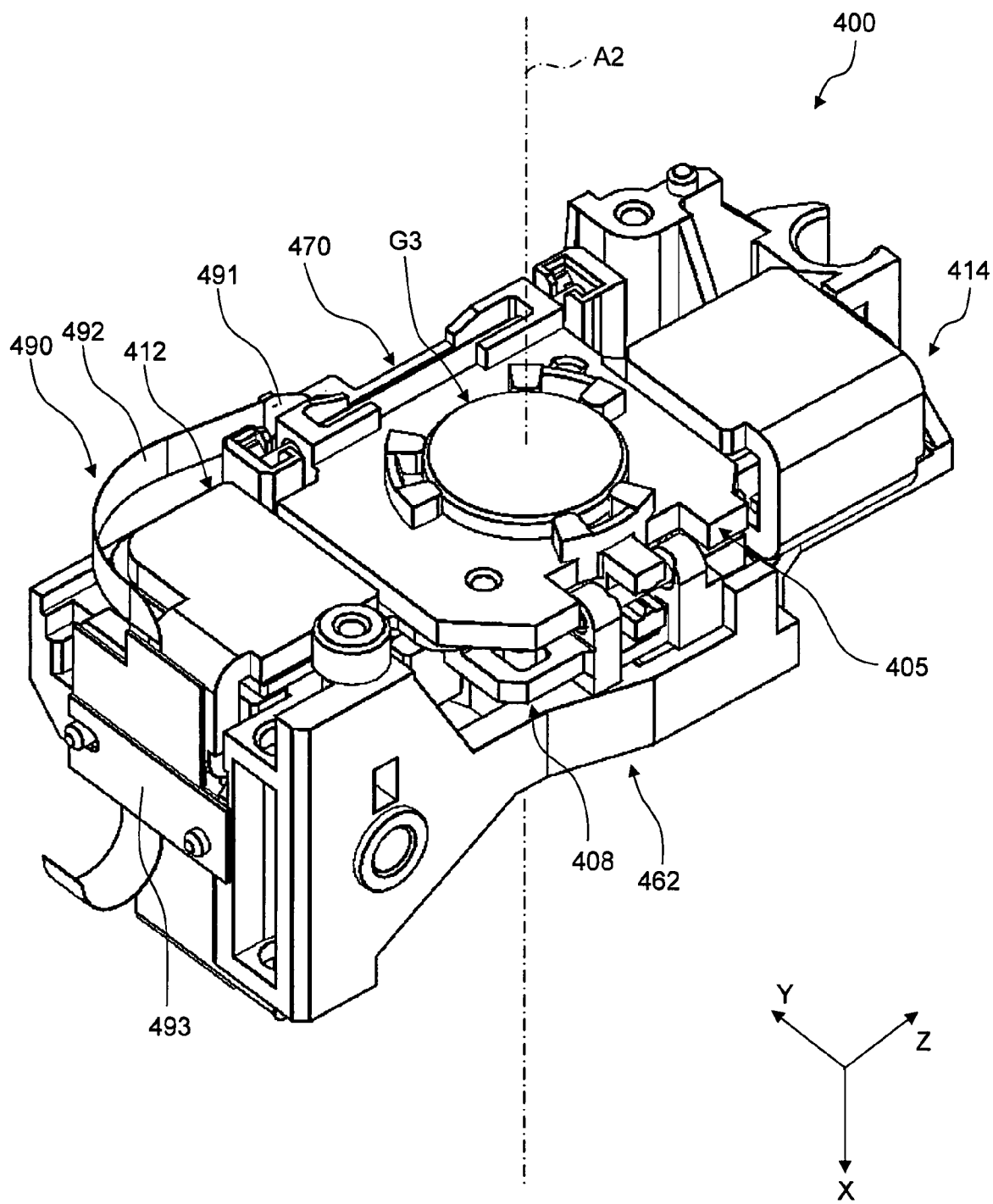
FIG. 7 is a perspective view of the image blur correction device.
Figure 9:
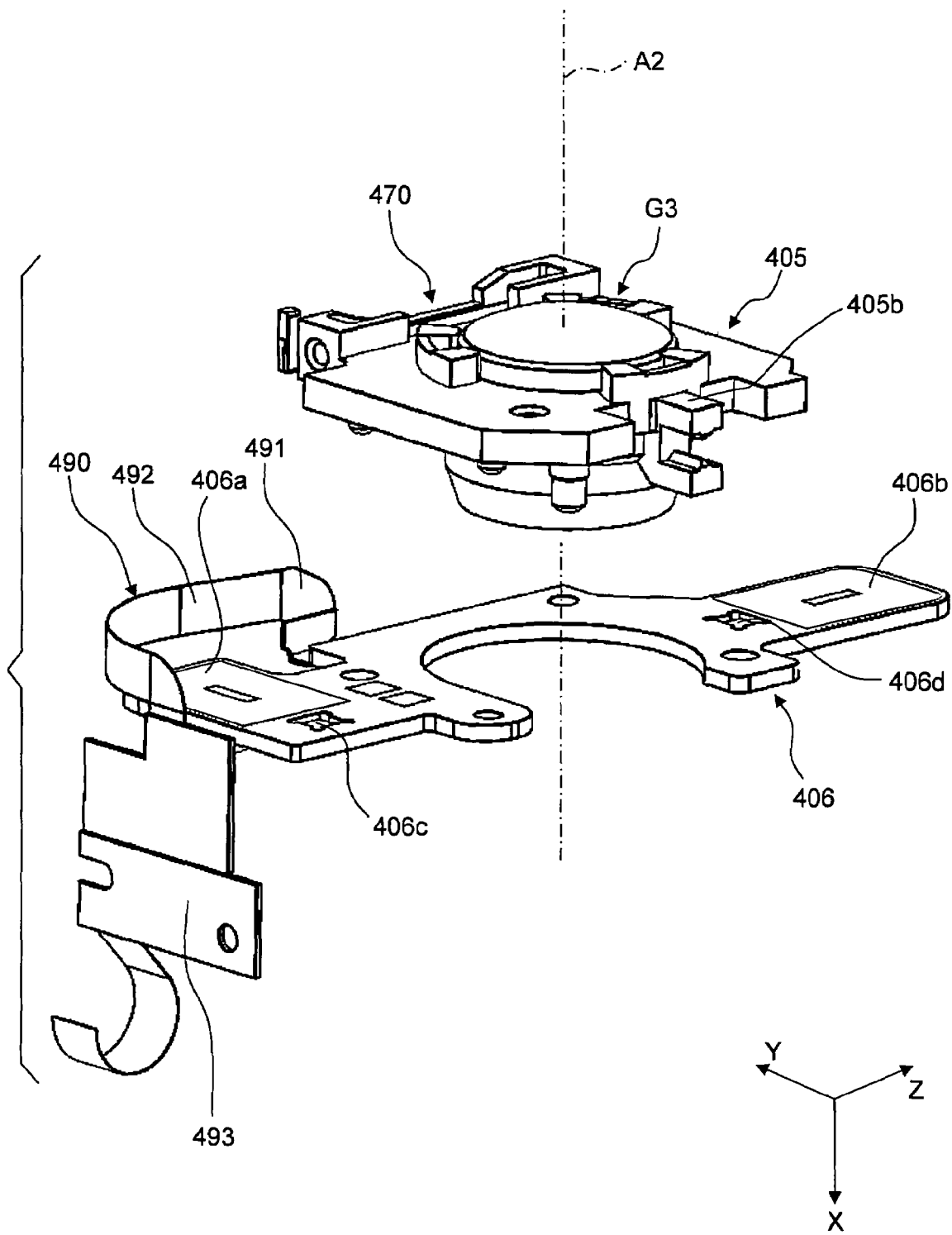
FIG. 9 is a perspective view of the pitching movement frame and the electrical board.
Figure 10:
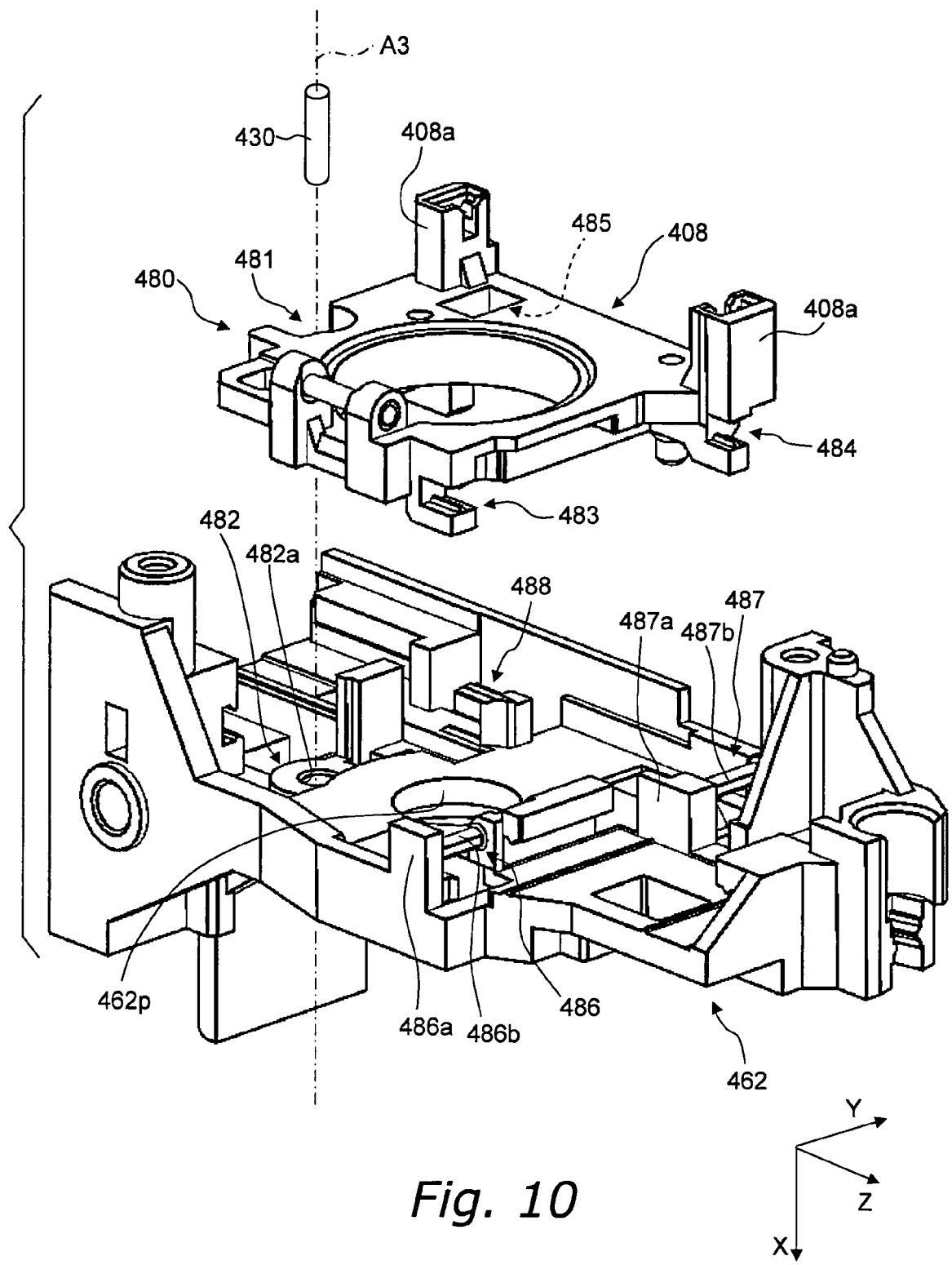
FIG. 10 is a perspective view of the yawing movement frame and the third group frame.
Figure 11:
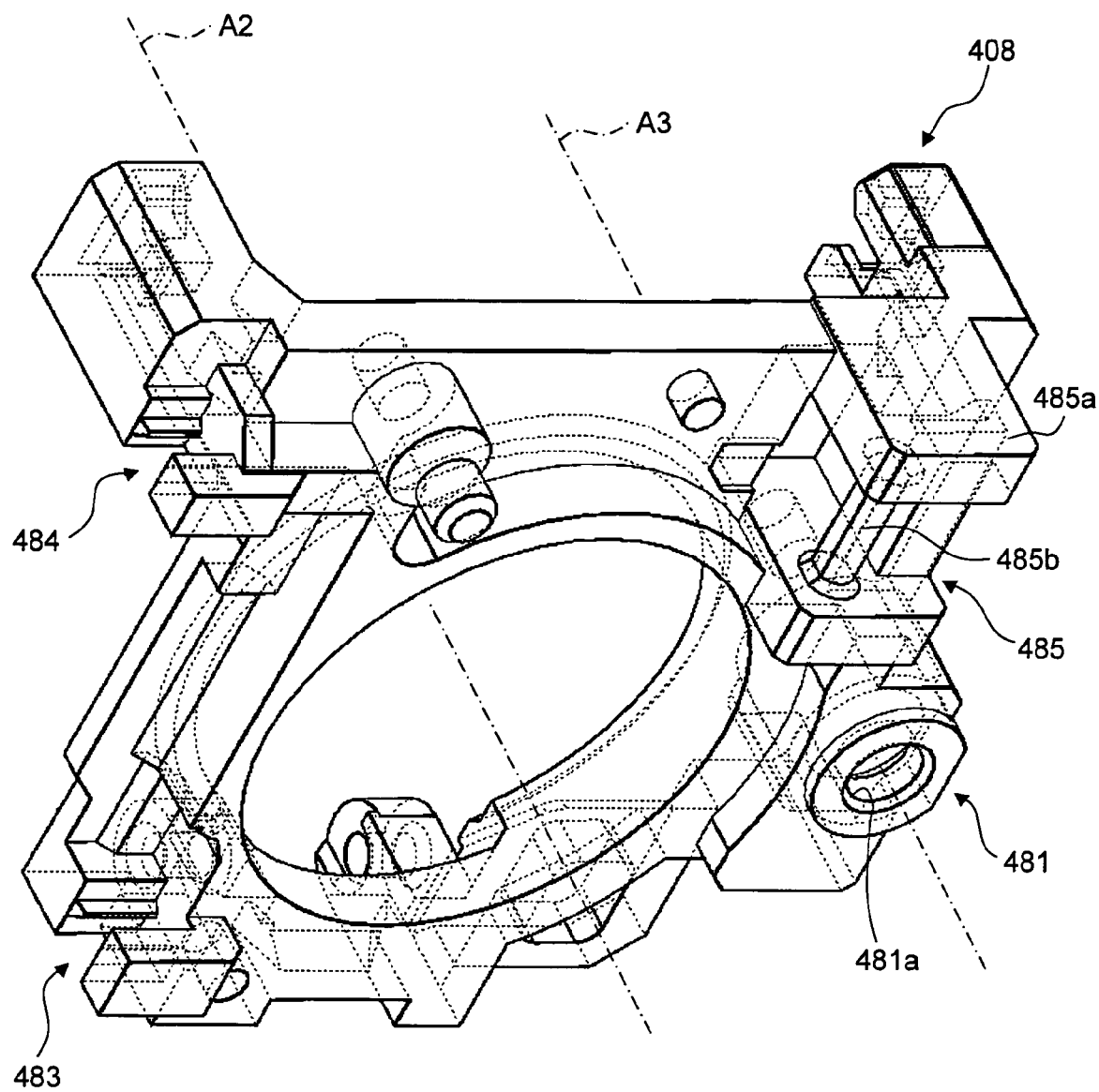
FIG. 11 is a perspective view of the yawing movement frame.
Figure 12:
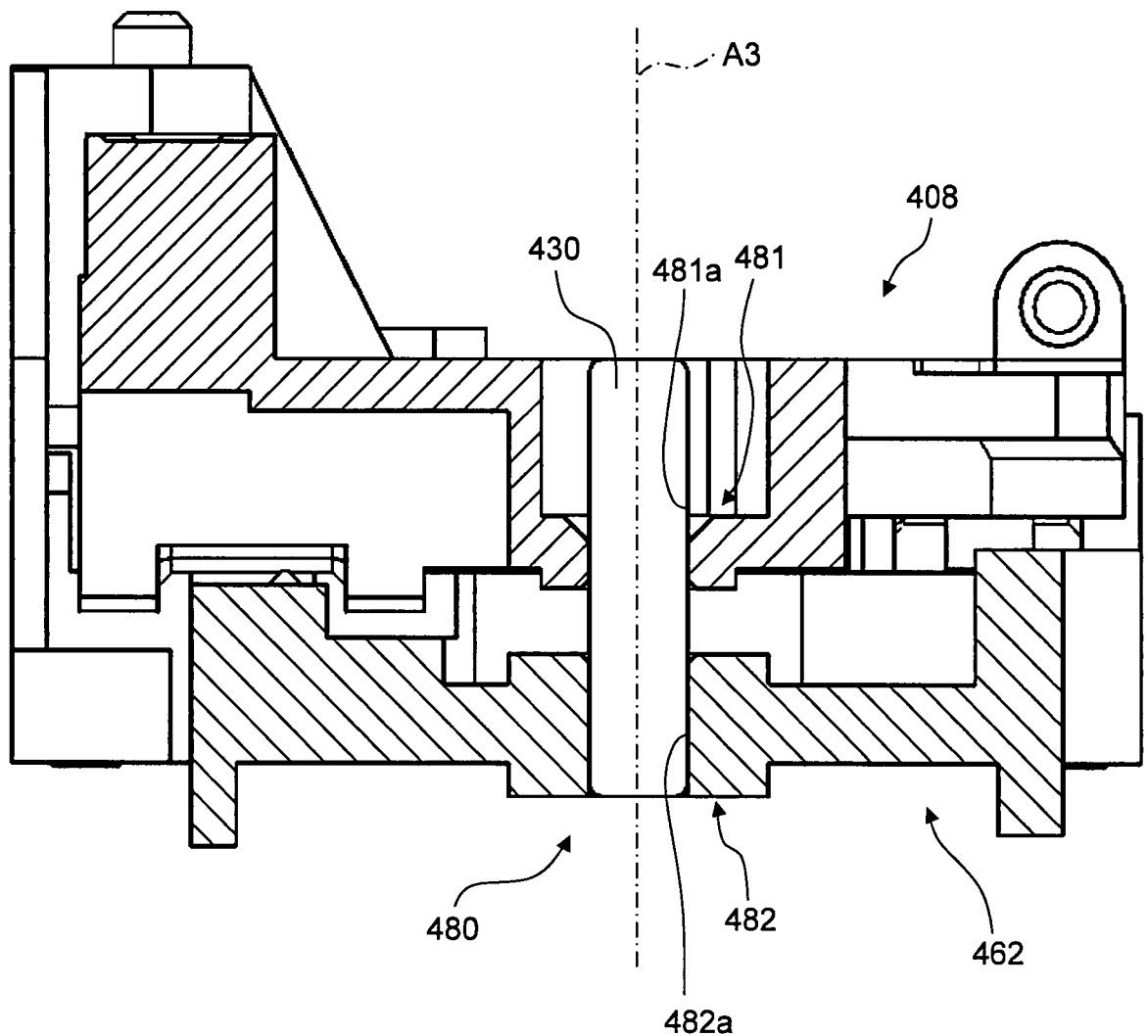
FIG. 12 is a simplified cross section of the area around the yawing guide mechanism in a plane perpendicularly intersecting the Z axis and including the rotational axis.

(4.2) Image Blur Correction Device (4.2.1) Overall Constitution of Image Blur Correction Device First, the overall constitution of the image blur correction device 400 will be described through reference to FIGS. 7 to 12. FIG. 7 is a perspective view of the image blur correction device 400, FIG. 8 is an exploded perspective view of the image blur correction device 400, FIG. 9 is a perspective view of a pitching movement frame 405 and an electrical board 406, FIG. 10 is a perspective view of a yawing movement frame 408 and the third group frame 462, FIG. 11 is a perspective view of the yawing movement frame 408, and FIG. 12 is a simplified cross section of the area around a yawing guide mechanism 480 in a plane perpendicularly intersecting the Z axis and including the rotational axis A3.

Figure 8:
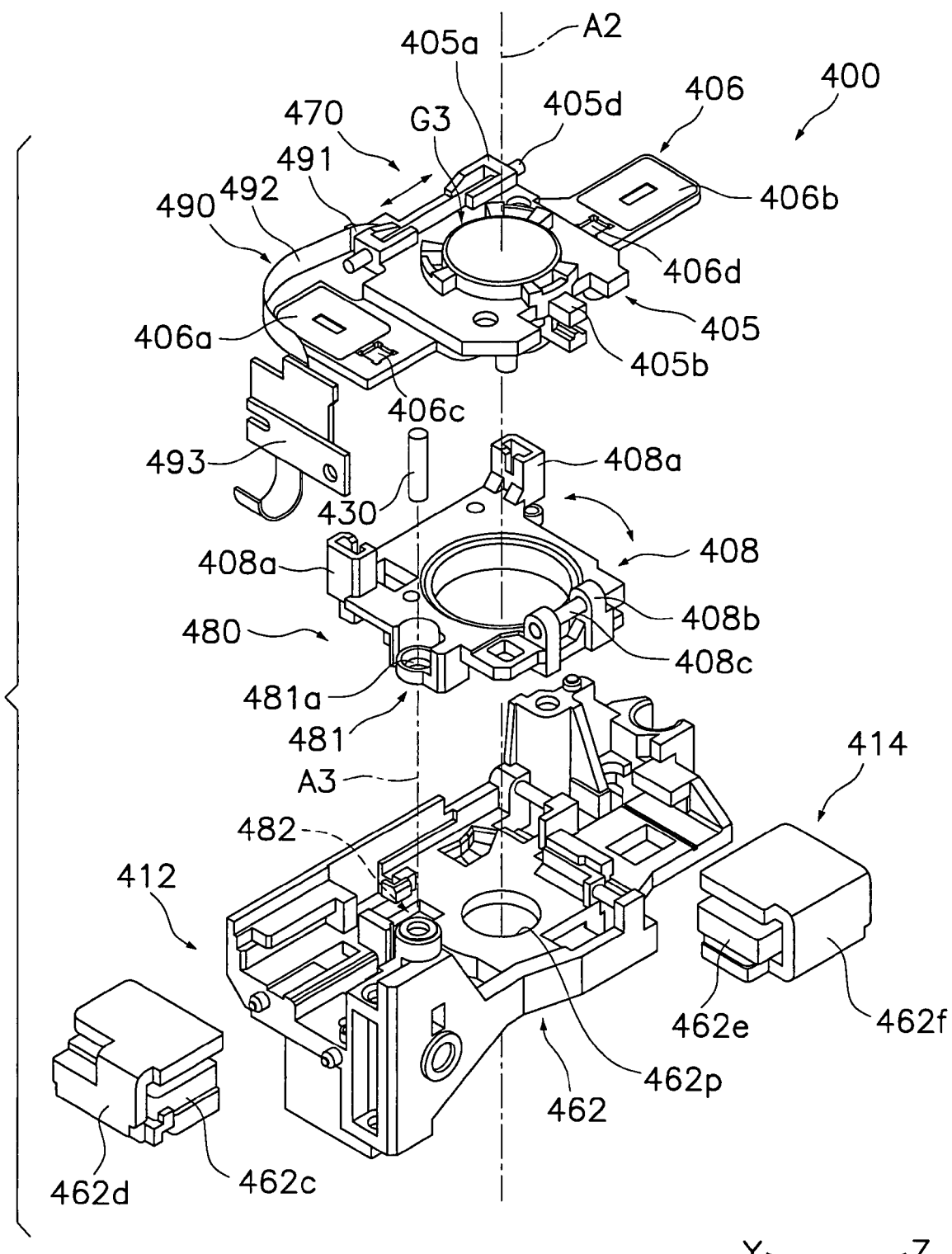
FIG. 8 is an exploded perspective view of the image blur correction device.

As shown in FIGS. 7 and 8, the image blur correction device 400 mainly has the pitching movement frame 405 as part of a lens support member that supports the third lens group G3, the electrical board 406 as part of the lens support member fixed to the pitching movement frame 405, the yawing movement frame 408 as a first support member that supports the pitching movement frame 405 to be movable in the pitching direction (Z axial direction), the third group frame 462 as a second support member that supports the yawing movement frame 408 to be movable in the yawing direction, a electromagnetic actuator 412 for linearly driving as a drive unit for linearly driving, and a electromagnetic actuator 414 for rotationally driving as a drive unit for rotationally driving.

The pitching movement frame 405 and the yawing movement frame 408 are linked via a pitching guide mechanism 470 that guides in the pitching direction. The yawing movement frame 408 and the third group frame 462 are linked via the yawing guide mechanism 480 that guides in the yawing direction along an arc whose center is the rotational axis A3. The yawing guide mechanism 480 will be described in detail below.

The "pitching direction" referred to here means the Z axial direction (linear direction), while the "yawing direction" means the direction along an arc whose center is the rotational axis A3 (rotational direction).

The pitching guide mechanism 470 mainly has a bearing 405a and a rotation stop 405b formed on the pitching movement frame 405, and a fixed component 408a, a protruding portion 408b, and a shaft 408c formed on the yawing movement frame 408. Both ends of a pitch shaft 405d slidably inserted in the bearing 405a are adhesively fixed to the fixed component 408a. The shaft 408c, which is slidably fitted to the rotation stop 405b, is fixed to the protruding portion 408b.

As shown in FIGS. 8 and 9, the electromagnetic actuator 412 directly imparts driving force in the Z axial direction to the pitching movement frame 405 (more precisely, the electrical board 406) so that the third lens group G3 will move in the pitching direction. More specifically, the electromagnetic actuator 412 is disposed on the Z axial direction negative side of the third lens group G3, and mainly has a yoke 462d fixed to the third group frame 462, a magnet 462c fixed to the yoke 462d, and a coil 406a for linearly driving formed on the electrical board 406. The magnet 462c has undergone dipole magnetization in the Z axial direction. The electromagnetic actuator 412 generates an electromagnetic force Fp in the pitching direction.

A hole element 406c is disposed on the Y axial direction positive side of the coil 406a as a linear position detection element for detecting the magnetic flux of the magnet 462c and detecting the Z axial direction position of the third lens group G3. The hole element 406c shares the magnet 462c with the electromagnetic actuator 412.

The electromagnetic actuator 414 directly imparts driving force in the Y axial direction to the pitching movement frame 405 (more precisely, the electrical board 406) so that the third lens group G3 will rotate around the rotational axis A3. More specifically, the electromagnetic actuator 414 is disposed on the Z axial direction positive side of the third lens group G3, and mainly has a yoke 462f fixed to the third group frame 462, a magnet 462e for rotationally driving fixed to the yoke 462f, and a coil 406b for rotationally driving formed on the electrical board 406. The magnet 462e has undergone dipole magnetization in the Y axial direction. The electromagnetic actuator 414 generates an electromagnetic force Fy in the yawing direction.

A hole element 406d is disposed on the Z axial direction negative side of the coil 406b as a rotational position detection element for detecting the magnetic flux of the magnet 462e and detecting the Y axial direction position of the third lens group G3. The hole element 406d shares the magnet 462e with the electromagnetic actuator 414.

The electromagnetic actuator 414 is disposed on the opposite side of the third lens group G3 from the electromagnetic actuator 412. In other words, the third lens group G3 is disposed in a region between the electromagnetic actuator 414 and the electromagnetic actuator 412. The planar disposition of the constituent components will be described in detail below.

As shown in FIGS. 7 to 9, the image blur correction device 400 further has a flexible printed circuit board 490 for supplying voltage to the electrical board 406. The flexible printed circuit board 490 is electrically connected to the electrical board 406. More specifically, the flexible printed circuit board 490 includes a first fixed portion 491 that is fixed to the rear side of the electrical board 406 and is electrically connected to the electrical board 406, a flexible portion 492 that extends from the first fixed portion 491 on the Z axial direction negative side, and a second fixed portion 493 that is formed at the end of the flexible portion 492 and fixed to the third group frame 462.

As shown in FIGS. 7 and 8, the flexible portion 492 is disposed on the rotational axis A3 side of the third lens group G3 (see FIG. 8). More specifically, the flexible portion 492 is disposed on the Y axial direction positive side and the Z axial direction negative side of the third lens group G3. The flexible portion 492 extends in the Z axial direction from the portion of the electrical board 406 on the Y axial direction positive side, and on the outside of the coil 406a the flexible portion 492 is bent in the Y axial direction.

When the pitching movement frame 405 moves in the pitching direction and yawing direction with respect to the third group frame 462, the first fixed portion 491 and the second fixed portion 493 move relative to each other. At this point, the flexible portion 492 bends in the Z axial direction and Y axial direction between the first fixed portion 491 and the second fixed portion 493, and the relative movement of the first fixed portion 491 and the second fixed portion 493 is absorbed.

(4.2.2) Yawing Guide Mechanism 480

This image blur correction device 400 is characterized by the constitution of the yawing guide mechanism 480. Specifically, as shown in FIG. 8, the yawing movement frame 408 and the third group frame 462 are linked rotatably around the rotational axis A3 disposed on the outside of the third lens group G3, via the yawing guide mechanism 480. More specifically, as shown in FIGS. 8, 10, and 11, the yawing guide mechanism 480 mainly has a first bearing 481 formed in the yawing movement frame 408 (see FIGS. 8, 11, and 12), a second bearing 482 formed in the third group frame 462 (see FIGS. 10 and 12), and a pin 430 extending in the X axial direction.

The first bearing 481 is formed on the Z axial direction negative side of the yawing movement frame 408, and has a hole 481a passing through in the X axial direction (see FIG. 12). The second bearing 482 is formed on the Z axial direction positive side of an opening 462p formed around the second optical axis A2 of the third group frame 462, and has a hole 482a passing through in the X axial direction.

As shown in FIG. 12, the portion of the pin 430 on the X axial direction positive side is press-fitted, for example, in the hole 482a of the second bearing 482. That is, the pin 430 is fixed to the third group frame 462 via the second bearing 482. The portion of the pin 430 on the X axial direction negative side is fitted into the hole 481a of the first bearing 481 via a microscopic gap. The center of the pin 430 substantially coincides with the rotational axis A3.

With the above constitution, the yawing movement frame 408 and the third group frame 462 are linked rotatably around the rotational axis A3.

Also, the yawing movement frame 408 and the third group frame 462 are supported to be movable in a plane perpendicularly intersecting the second optical axis A2 by the yawing guide mechanism 480, and their relative movement in the second optical axis A2 direction is restricted. This restricted portion (support component) is provided at three places in a plane perpendicularly intersecting the X axis. More specifically, as shown in FIGS. 10 and 11, the yawing guide mechanism 480 further has three first support portions 483, 484, and 485 provided to the yawing movement frame 408 (see FIGS. 10 and 11) and three second support portions 486, 487, and 488 provided to the third group frame 462 (see FIG. 10).

A shown in FIGS. 10 and 11, the first support portions 483, 484, and 485 are disposed around the third lens group G3. The first support portions 483 and 484 are substantially U-shaped portions, while the first support portion 485 is rod-shaped. As shown in FIG. 10, the second support portions 486, 487, and 488 are disposed at positions corresponding to the first support portions 483, 484, and 485. The second support portions 486 and 487 are rod-shaped, and the second support portion 488 is substantially U-shaped. The first support portion 483 is slidably engaged with the second support portion 486, the first support portion 484 is slidably engaged with the second support portion 487, and the first support portion 485 is slidably engaged with the second support portion 488.

The various components will now be described in detail.

As shown in FIGS. 10 and 11, the first support portion 483 is substantially U-shaped, being open on the Z axial direction positive side, and is formed around the outer periphery of the yawing movement frame 408. The second support portion 486 is disposed at a position corresponding to the first support portion 483 of the third group frame 462. The second support portion 486 has a pair of protruding portions 486a and a shaft 486b fixed between the pair of protruding portions 486a. The shaft 486b is rod-shaped, extending in the Y axial direction, for example, and is inserted in the Z axial direction into the substantially U-shaped first support portion 483.

A microscopic gap is left between the shaft 486b and the first support portion 483 in the X axial direction so that the first support portion 483 will be movable in the Y axial direction and the Z axial direction with respect to the shaft 486b. A gap is also left between the first support component 483 and the protruding portions 486a in the Y axial direction so that the first support portion 483 and the protruding portions 486a will not interfere within the movable range of the yawing movement frame 408.

The first support portion 484 is substantially U-shaped, being open on the Z axial direction positive side, and is formed around the outer periphery of the yawing movement frame 408. The second support portion 487 is disposed at a position corresponding to the first support portion 484 of the third group frame 462. The second support portion 487 has a pair of protruding portions 487a and a shaft 487b fixed between the pair of protruding portions 487a. The shaft 487b is rod-shaped, extending in the Y axial direction, for example, and is inserted into the substantially U-shaped first support portion 484 in the Z axial direction.

A microscopic gap is left between the shaft 487b and the first support portion 484 in the X axial direction so that the first support portion 484 will be movable with respect to the shaft 487b. A gap is also left between the first support portion 484 and the protruding portions 487a in the Y axial direction so that the first support portion 484 and the protruding portions 487a will not interfere within the movable range of the yawing movement frame 408.

The first support portion 485 is formed around the outer periphery of the yawing movement frame 408, and has a pair of protruding portions 485a and a shaft 485b fixed in between the pair of protruding portions 485a. The second support portion 488 is disposed at a position corresponding to the first support portion 485 of the third group frame 462. The shaft 485b is rod-shaped, extending in the Y axial direction, for example, and is inserted into the substantially U-shaped second support portion 488 in the Z axial direction.

A microscopic gap is left between the shaft 485b and the second support portion 488 in the X axial direction so that the second support portion 488 will be movable with respect to the shaft 485b. A gap is also left between the second support portion 488 and the protruding portions 485a in the Y axial direction so that the second support portion 488 and the protruding portions 485a will not interfere within the movable range of the yawing movement frame 408.

With the above constitution, the yawing movement frame 408 is supported by the third group frame 462 so as to be capable of movement within a specific range, in a plane perpendicularly intersecting the second optical axis A2. Also, the relative movement of the yawing movement frame 408 and the third group frame 462 to the X axial direction positive side and negative side is restricted by the yawing guide mechanism 480. This stabilizes the position of the yawing movement frame 408 in the second optical axis A2 direction with respect to the third group frame 462 in the rotation of the yawing movement frame 408, and prevents a decrease in image blur correction performance.

Also, one of the above-mentioned first and second support portions is rod-shaped, and the other is substantially U-shaped. Accordingly, the movement of the yawing movement frame 408 in the second optical axis A2 direction with respect to the third group frame 462 can be restricted with a simple constitution.

As discussed above, with this image blur correction device 400, the pitching movement frame 405 can be driven in the pitching direction with respect to the third group frame 462 by the electromagnetic actuator 412, and the pitching movement frame 405 and the yawing movement frame 408 can be driven in the yawing direction with respect to the third group frame 462 by the electromagnetic actuator 414. That is, with this image blur correction device 400, the third lens group G3 is driven in the pitching and yawing directions with respect to the second optical axis A2.

(4.2.3) Positional Relationship of Components of Image Blur Correction Device 400

Figure 13:
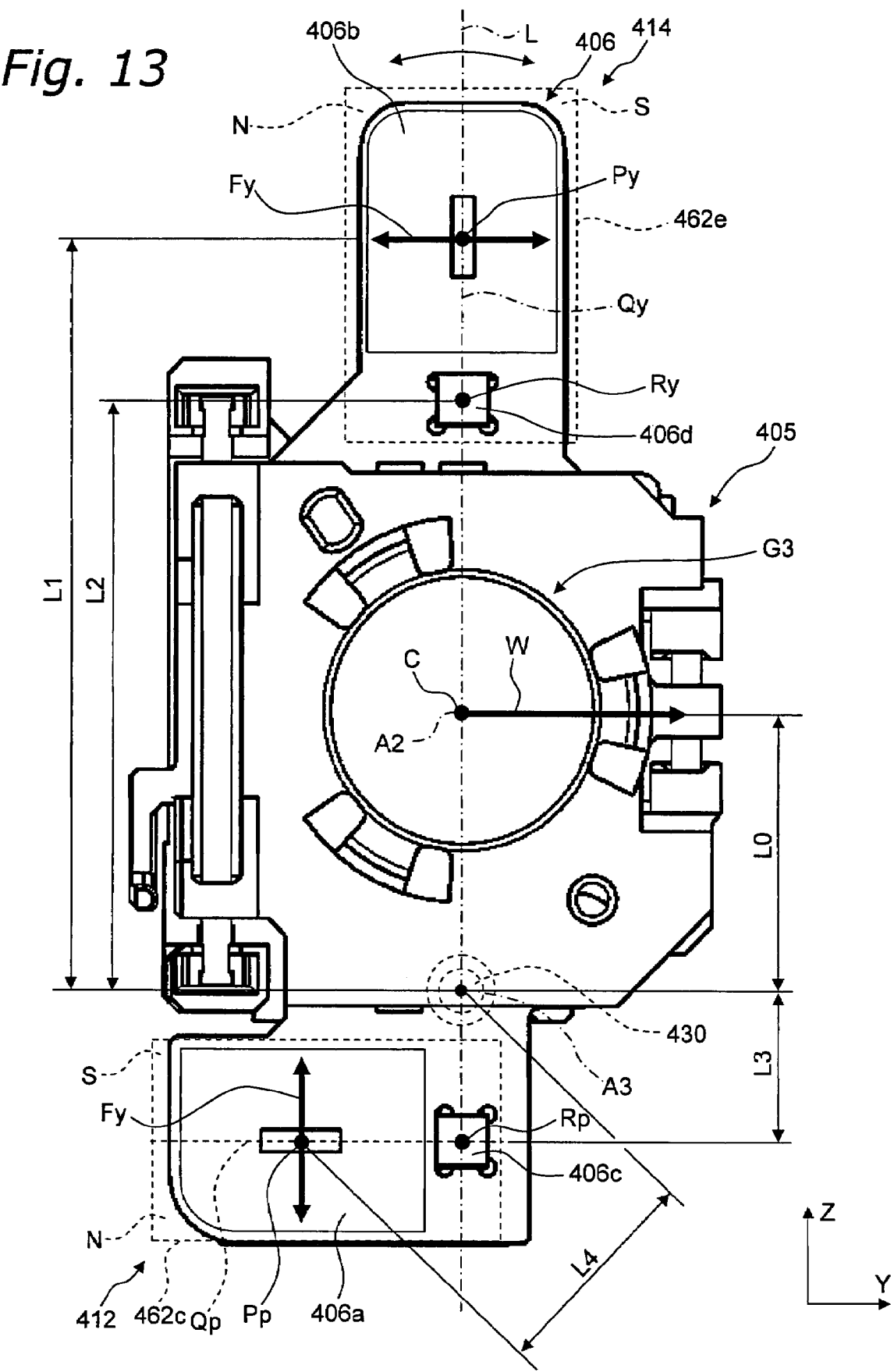
FIG. 13 is a simplified plan view of the pitching movement frame and the electrical board as seen from the X axial direction negative side.
Figure 14:
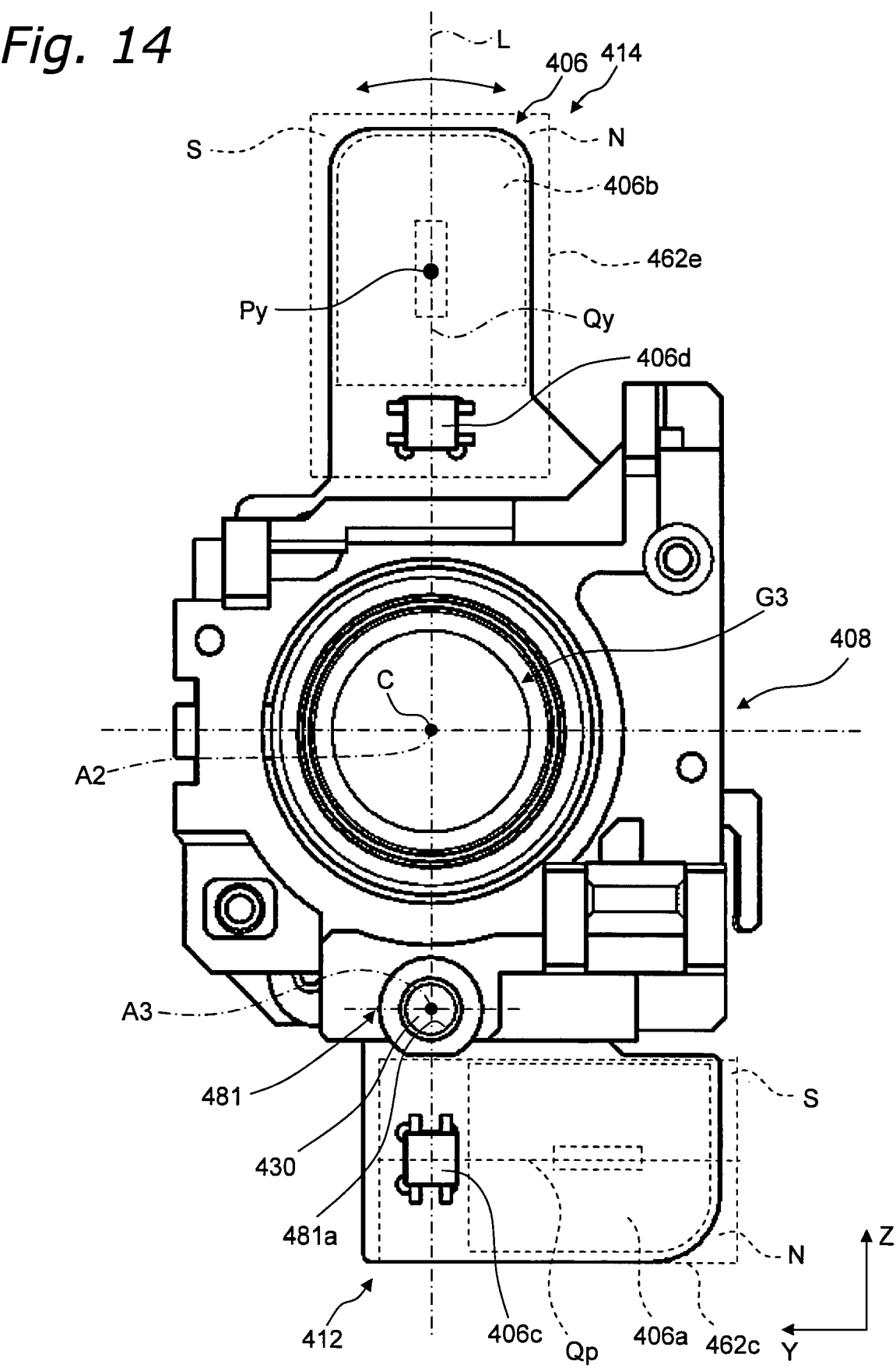
FIG. 14 is a simplified plan view of the pitching movement frame and the electrical board as seen from the X axial direction positive side.

The image blur correction device 400 is also characterized by the positional relationship of its components. The positional relationship of the various components will be described in detail through reference to FIGS. 13 and 14. FIG. 13 is a simplified plan view of the pitching movement frame 405 and the electrical board 406 as seen from the X axial direction negative side, and FIG. 14 is a simplified plan view of the pitching movement frame 405 and the electrical board 406 as seen from the X axial direction positive side. FIGS. 13 and 14 show a state in which the second optical axis A2 coincides with the center C of the third lens group G3, that is, a state in which the position of the third lens group G3 is close to the middle of the movable range.

As shown in FIGS. 13 and 14, in a state in which the second optical axis A2 coincides with the center C of the third lens group G3, the center Py of the hole elements 406c and 406d and the coil 406b of the image blur correction device 400 is disposed within a plane including the center C of the third lens group G3 and the rotational axis A3. That is, within the movable range of the pitching movement frame 405, the center Py of the hole elements 406c and 406d and the coil 406b and the center C of the third lens group G3 and the rotational axis A3 are disposed on a straight line L extending in the Z axial direction.

The phrase "the center Py of the coil 406b" as used here refers to the center found from the planar exterior shape of the coil 406b, and when the coil is substantially quadrangular, for example, it refers to the center of this quadrangle. In the case of this embodiment, the center Py of the coil 406b is found from the dimensions of the coil 406b in the Y axial direction and the Z axial direction. The center Py substantially refers to the center of the load generation region (the load generation point) of the electromagnetic actuator 414. To put this another way, in the electromagnetic actuator 414, the center Py is the center of the load action region (the load action point) of the pitching movement frame 405. The same applies to the center Pp of the coil 406a as to the center Py.

Within the movable range of the pitching movement frame 405 there exists a state in which the detection center Ry of the hole element 406d coincides with the polarization line Qy of the magnet 462e. In a state in which the detection center Ry of the hole element 406d coincides with the polarization line Qy of the magnet 462e, the direction of the polarization line Qy of the magnet 462e substantially coincides with the pitching direction (Z axial direction). Furthermore, as shown in FIGS. 13 and 14, in a state in which the second optical axis A2 coincides with the center C of the third lens group G3, the detection center Ry of the hole element 406d substantially coincides with the polarization line Qy of the magnet 462e.

In the state shown in FIGS. 13 and 14, the rotational axis A3, the center C of the third lens group G3, and the detection center Ry of the hole element 406d are disposed approximately on the straight line L. A line segment connecting the rotational axis A3 and the detection center Rp of the hole element 406c substantially coincides with the pitching direction (Z axial direction).

As shown in FIGS. 13 and 14, the distance L1 between the rotational axis A3 and the center Py of the coil 406b is longer than the distance L0 between the rotational axis A3 and the center C of the third lens group G3. The distance L2 between the rotational axis A3 and the detection center Ry of the hole element 406d is shorter than the distance L1 between the rotational axis A3 and the center Py of the coil 406b. The distance L3 between the rotational axis A3 and the detection center Rp of the hole element 406c is shorter than the distance L4 between the rotational axis A3 and the center Pp of the coil 406a.

Meanwhile, as shown in FIGS. 13 and 14, within the movable range of the pitching movement frame 405 there exists a state in which the detection center Rp of the hole element 406c coincides with the polarization line Qp of the magnet 462c. In a state in which the second optical axis A2 coincides with the center C of the third lens group G3, the detection center Rp of the hole element 406c substantially coincides with the polarization line Qp of the magnet 462c.

In the state shown in FIGS. 13 and 14, the polarization line Qy and the straight line L substantially perpendicularly intersect the direction of the electromagnetic force Fy generated by the electromagnetic actuator 414. That is, in the state shown in FIGS. 13 and 14, a plane including the rotational axis A3 and the action point of the electromagnetic force Fy substantially perpendicularly intersect the direction in which the electromagnetic force Fy acts.

Figure 17A:
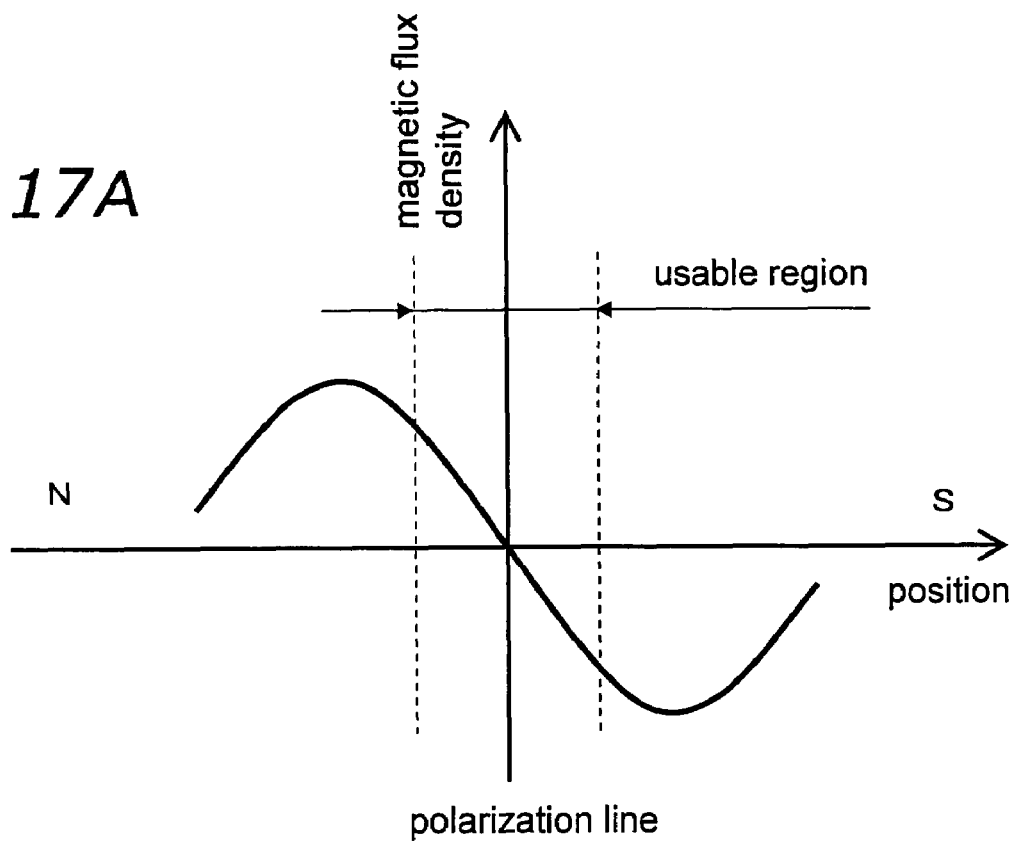
FIG. 17A is a graph showing the usable region of the magnet.

The phrase "detection center of the hole element" as used here is an imaginary point at which it can be thought that the hole element is disposed at one point in position detection. Examples of the detection center include the point at which detection sensitivity of the hole element is at its maximum. In general, the detection center can be assumed to be the center point of the detection face of the hole element. The "polarization line of the magnet" refers to a boundary line at which polarity changes between the N pole and the S pole. As shown in FIG. 17A, the magnetic magnetic flux density distribution of a magnet includes a usable region centered around the polarization line, in which the magnetic magnetic flux density varies at a substantially constant ratio. The "usable region" refers to the range over which use for position detection is possible; within this usable region, the measured value of the hole element varies substantially linearly according to the measurement positions, and accurate position detection is possible.

Figure 17B:
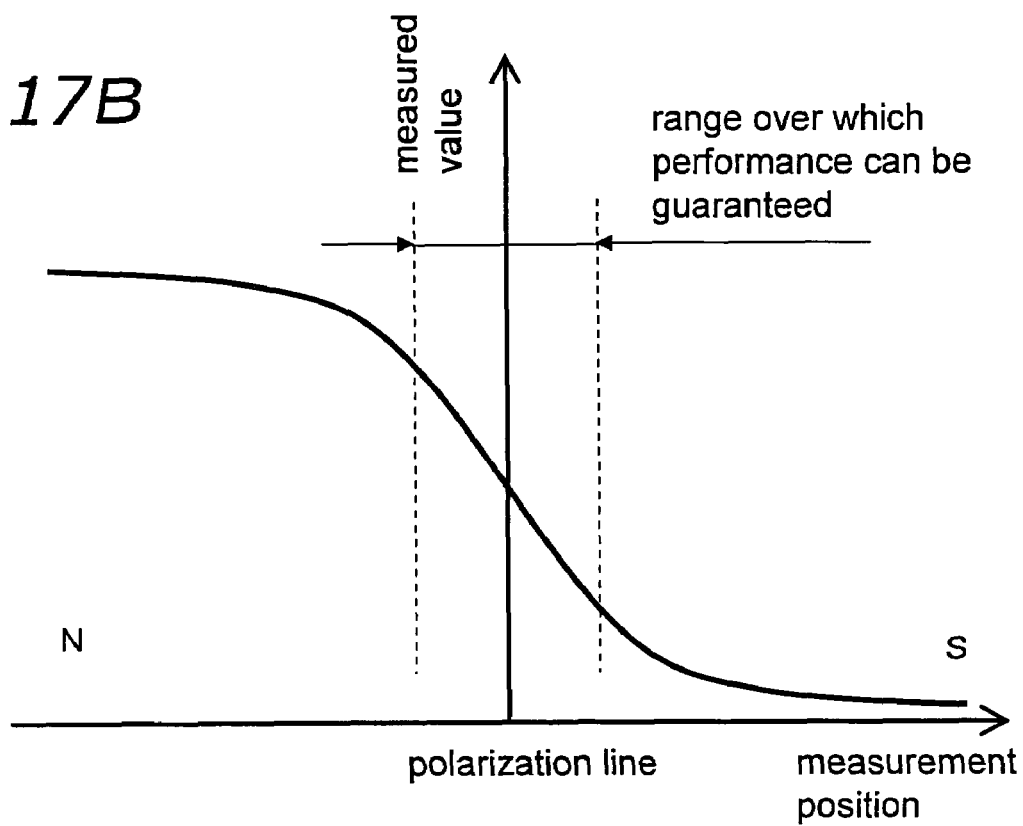
FIG. 17B is a graph showing the range over which the performance of the hole element can be guaranteed.

As shown in FIG. 17B, for example, within the usable region of the magnet, if there is a change in the relative positions of the hole element and the magnet (measurement positions), the measured value (output) of the hole element will vary substantially linearly according to the change in the relative position. Accordingly, it is possible to find the accurate relative position of the hole element with respect to the magnet on the basis of the output of the hole element. Specifically, the usable region of the magnet corresponds to the range over which performance of position detection can be guaranteed. If the movable range of the hole element is within this range of guaranteed performance, the hole element can stand up to use as a position detection element for image blur correction.

In the case of the image blur correction device 400, the magnetic magnetic flux density distribution in the pitching direction (Z axial direction) of the magnet 462c includes a usable region centered around the polarization line Qp. The magnetic magnetic flux density distribution in the yawing direction (Y axial direction) of the magnet 462e includes a usable region centered around the polarization line Qy. The movable range of the detection center Rp of the hole element 406c is set to within the usable region of the magnet 462c. The movable range of the detection center Ry of the hole element 406d is set to within the usable region of the magnet 462e.

(4.2.4) Method for Assembling Image Blur Correction Device 400

The image blur correction device 400 is also characterized by its method of assembly. The method for assembling the image blur correction device 400, and particularly the method for assembling the yawing movement frame 408 and the third group frame 462, will be described through reference to FIGS. 15 and 16. FIG. 15 consists of diagrams illustrating the method for assembling the yawing movement frame 408 and the third group frame 462, as seen from the Y axial direction negative side, and FIG. 16 consists of schematics of the mated state of the first support portion and second support portion.

Figure 15A:
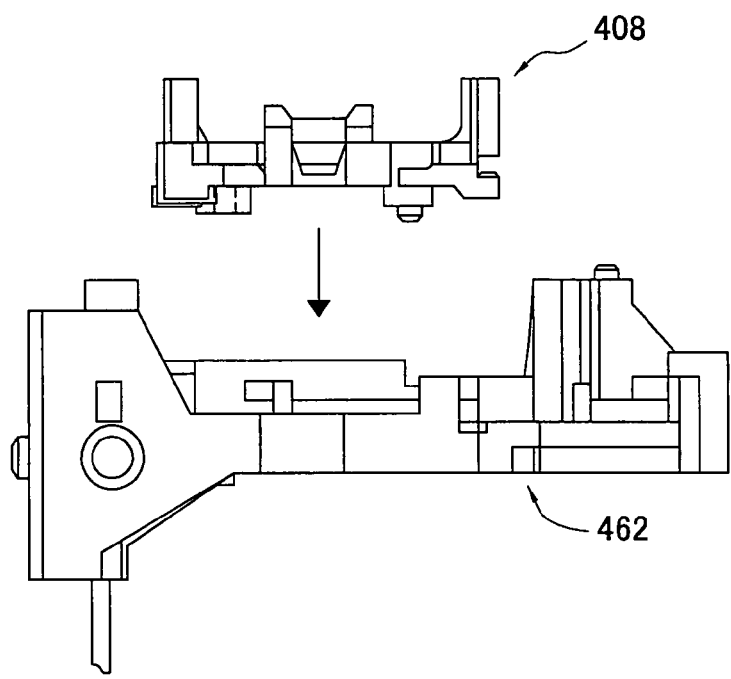
FIGS. 15A, 15B, 15C are diagrams illustrating the method for assembling the yawing movement frame and the third group frame, as seen from the Y axial direction negative side.
Figure 16A:
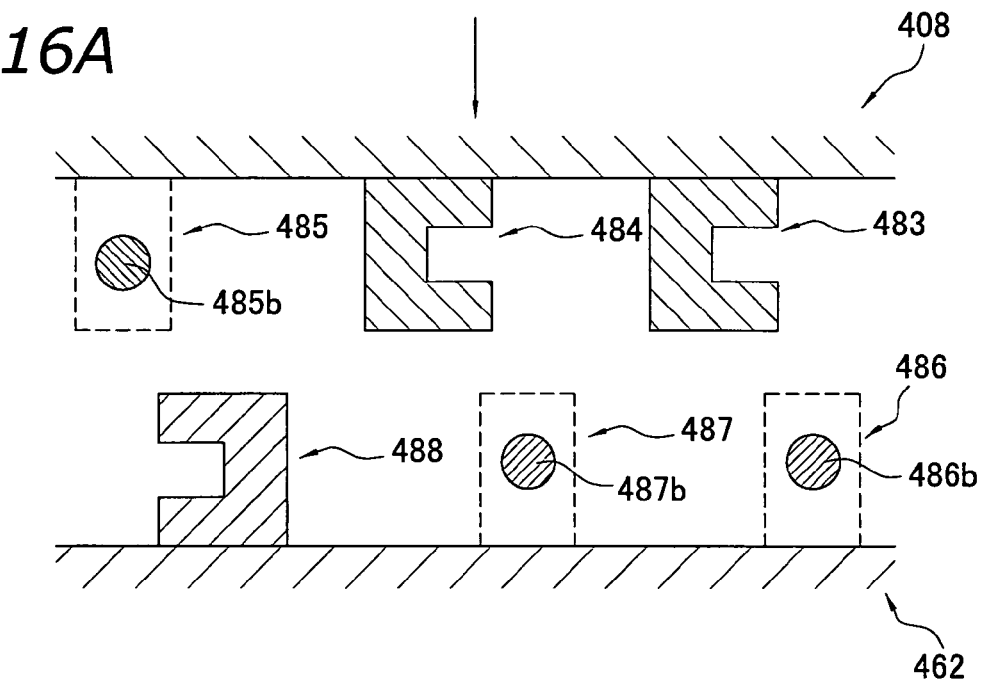
FIGS. 16A, 16B, 16C are schematics of the mated state of the first support portion and second support portion.
Figure 16B:
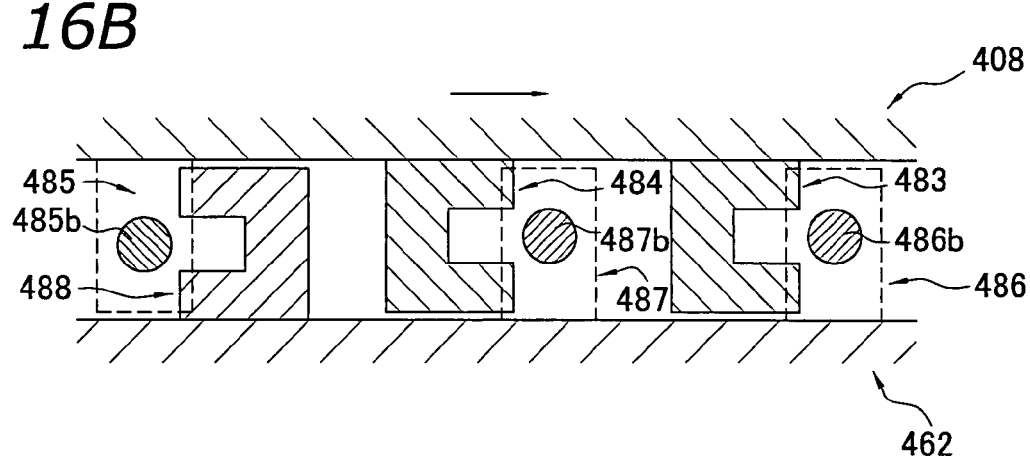

As shown in FIG. 15A, first the yawing movement frame 408 is mated to the face on the X axial direction negative side of the third group frame 462. At this point, as shown in FIGS. 16A and 16B, the first support portions 483 and 484 of the yawing movement frame 408 are inserted into the spaces around the second support portions 486 and 487 of the third group frame 462, and the second support portion 488 is inserted into the space around the first support portion 485.

Figure 15B:
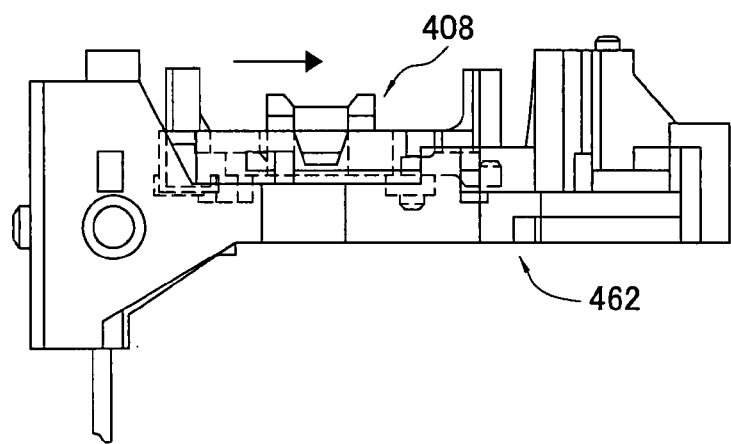
Figure 16C:
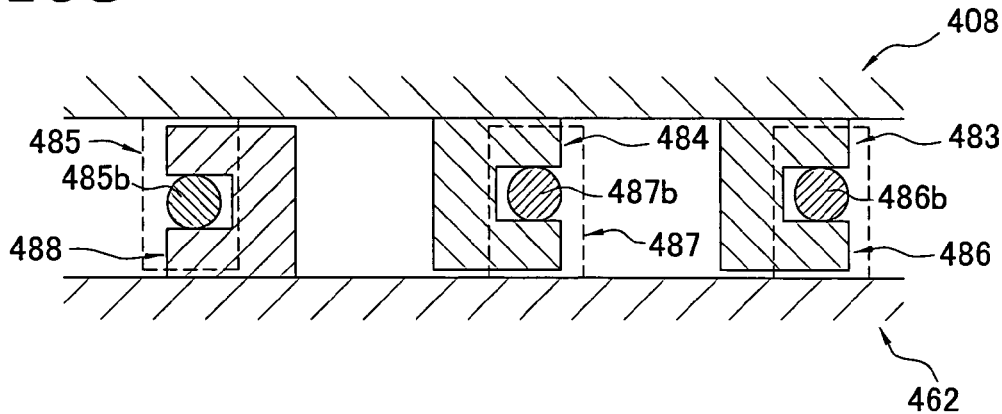

Then, as shown in FIG. 15B, the yawing movement frame 408 is slid to the Z axial direction positive side with respect to the third group frame 462. As shown in FIG. 16C, this results in the shafts 486b and 487b of the second support portions 486 and 487 being inserted into the substantially U-shaped first support portions 483 and 484, and in the shaft 485b of the first support portion 485 being inserted into the substantially U-shaped second support portion 488.

Figure 15C:
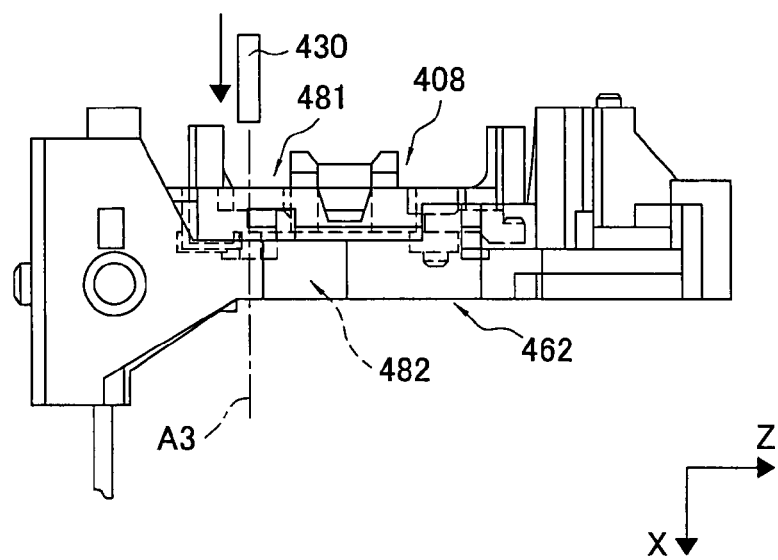

Then, as shown in FIG. 15C, the sliding of the yawing movement frame 408 is stopped at a position where the centers of the holes 481a and 482a of the first bearing 481 and the second bearing 482 substantially coincide, and the pin 430 is inserted into the holes 481a and 481b from the X axial direction negative side. At this point the pin 430 is press-fitted into the hole 482a of the second bearing 482 and fixed to the third group frame 462.

As discussed above, the yawing movement frame 408 and the third group frame 462 are linked by the first support portions 483, 484, and 485 and the second support portions 486, 487, and 488, and the pin 430 and the third group frame 462 can be fixed by press-fitting. In other words, there is no need to adhesively fix the ends of the yaw shaft to a support frame, for example, as was the case with a conventional image blur correction device.

The reason there is a difference in this assembly process is that whereas the direction in which the shaft extends and the direction in which the shaft is inserted are perpendicular with the linear format used in a conventional image blur correction device, the direction in which the pin 430 extends and the direction in which the pin 430 is inserted coincide with the rotary format used in the image blur correction device 400.

Therefore, with the image blur correction device 400, the step of bonding the pin 430 can be omitted, and there is no need to perform any post-treatment after bonding. This means that the manufacturing cost will be lower.

Since the positioning of the yawing movement frame 408 in the X axial direction with respect to the third group frame 462 is accomplished by three-point support by the first support portions 483, 484, and 485 and the second support portions 486, 487, and 488, as shown in FIG. 12, the first bearing 481 and the second bearing 482 can be disposed separated from each other in the X axial direction. Specifically, with this yawing guide mechanism 480, there is no need for the positioning of the yawing movement frame 408 and the third group frame 462 in the X axial direction to be performed by the first bearing 481 and the second bearing 482. Accordingly, there is no need to increase the dimensional accuracy in the X axial direction around the first bearing 481 and the second bearing 482, and this cuts down on the time entailed by machining. This in turn reduces the manufacturing cost.

Furthermore, as discussed above, the third group frame 462 and the yawing movement frame 408 can be assembled merely by placing the yawing movement frame 408 in relation to the third group frame 462 and sliding it in one direction, or inserting the pin 430. Accordingly, it is easier to automate the assembly process, and there is less variance in the assembly state, so assembly precision can be improved.

(5) Effect

The effect of the image blur correction device 400 discussed above are as follows.

(5.1)

With this image blur correction device 400, the yawing movement frame 408 is driven in the yawing direction (rotational direction) around the rotational axis A3 with respect to the third group frame 462. Therefore, a shaft for guiding in the yawing direction is unnecessary. This affords a reduction in size in the Y axial direction perpendicular to the pitching direction.

In addition, with this image blur correction device 400, driving force from the electromagnetic actuator 412 and the electromagnetic actuator 414 is directly imparted to the pitching movement frame 405 to which the third lens group G3 is fixed (more precisely, to the electrical board 406 to which the pitching movement frame 405 is fixed). Accordingly, a decrease in the positional accuracy of the third lens group G3 can be prevented better, and a decrease in image blur correction performance can be prevented better, than when the driving force of the electromagnetic actuators 412 and 414 does not act directly on the pitching movement frame 405.

Because of the above, with this image blur correction device 400, a decrease in image blur correction performance can be prevented while a smaller size can be achieved at the same time.

(5.2)

With this image blur correction device 400, in a state in which the detection center Ry of the hole element 406d coincides with the direction of the polarization line Qy of the magnet 462e, the direction of the polarization line Qy of the magnet 462e substantially coincides with the pitching direction (Z axial direction). Therefore, when the pitching movement frame 405 is driven in the pitching direction via the pitching guide mechanism 470, misalignment is suppressed in the yawing direction (rotational direction) between the detection center Ry of the hole element 406d and the polarization line Qy of the magnet 462e. As a result, the movable range of the detection center Ry of the hole element 406d tends to fit within the usable region of the magnet 462e. This prevents a decrease in position detection accuracy in the yawing direction from accompanying operation in the pitching direction.

Here, the phrase "the direction of the polarization line Qy of the magnet 462e substantially coincides with the pitching direction (Z axial direction)" encompasses a case in which the polarization line Qy and the pitching direction are misaligned in a state in which the movable range of the detection center Ry of the hole element 406d fits within the usable region of the magnet 462e, as well as a case in which the polarization line Qy completely coincides with the pitching direction.

(5.3)

With this image blur correction device 400, in a state in which the second optical axis A2 coincides with the center C of the third lens group G3, the detection center Ry of the hole element 406d substantially coincides with the polarization line Qy of the magnet 462e. Therefore, the range of the detection center Ry of the hole element 406d tends to fit within the usable region of the magnet 462e in a state in which the center C of the third lens group G3 coincides with the second optical axis A2. This prevents a decrease in position detection accuracy in the yawing direction.

Here, the phrase "the detection center Ry of the hole element 406d substantially coincides with the polarization line Qy of the magnet 462e" encompasses a case in which the polarization line Qy and the detection center Ry are misaligned in a state in which the movable range of the detection center Ry of the hole element 406d fits within the usable region of the magnet 462e, as well as a case in which the polarization line Qy completely coincides with the detection center Ry.

(5.4)

With this image blur correction device 400, the rotational axis A3, the center C of the third lens group G3, and the detection center Ry of the hole element 406d are disposed approximately on the straight line L. Therefore, when the pitching movement frame 405 is driven in the pitching direction, misalignment is suppressed between the detection center Ry of the hole element 406d and the polarization line Qy of the magnet 462e. As a result, the movable range of the detection center Ry of the hole element 406d tends to fit within the usable region of the magnet 462e. This prevents a decrease in position detection accuracy in the yawing direction.

Here, the phrase "the rotational axis A3, the center C of the third lens group G3, and the detection center Ry of the hole element 406d are disposed approximately on the straight line L" encompasses a case in which the rotational axis A3, the optical axis center, and the detection center Ry are misaligned in a state in which the movable range of the detection center Ry of the hole element 406d fits within the usable region of the magnet 462e, as well as a case in which the rotational axis A3, the optical axis center, and the detection center Ry are disposed on a single straight line.

(5.5)

With this image blur correction device 400, a line segment connecting the rotational axis A3 and the detection center Rp of the hole element 406c substantially coincides with the pitching direction (Z axial direction). Therefore, the movable range of the detection center Rp of the hole element 406c tends to fit within the usable region of the magnet 462e in a state in which the second optical axis A2 coincides with the center C of the third lens group G3. This prevents a decrease in position detection accuracy in the pitch direction.

Here, the phrase "a line segment connecting the rotational axis A3 and the detection center Rp of the hole element 406c substantially coincides with the pitching direction" encompasses a case in which this line segment and the pitching direction are misaligned in a state in which the movable range of the detection center Rp of the hole element 406c fits within the usable region of the magnet 462e, as well as a case in which this line segment completely coincides with the pitching direction.

(5.6)

With this image blur correction device 400, in a state in which the second optical axis A2 coincides with the center C of the third lens group G3, the detection center Rp of the hole element 406c substantially coincides with the polarization line Qp of the magnet 462c. Therefore, when the pitching movement frame 405 is driven in the yawing direction, misalignment is suppressed between the detection center Rp of the hole element 406c and the polarization line Qp of the magnet 462c. As a result, the movable range of the detection center Rp of the hole element 406c tends to fit within the usable region of the magnet 462c. This prevents a decrease in position detection accuracy in the pitching direction.

Here, the phrase "the detection center Rp of the hole element 406c substantially coincides with the polarization line Qp of the magnet 462c" encompasses a case in which the detection center Rp and the polarization line Qp are misaligned in a state in which the movable range of the detection center Rp of the hole element 406c fits within the usable region of the magnet 462e, as well as a case in which the detection center Rp completely coincides with the polarization line Qp.

(5.7)

With this image blur correction device 400, the distance L1 between the rotational axis A3 and the center Py of the coil 406b is longer than the distance L0 between the rotational axis A3 and the center C of the third lens group G3. Therefore, the center of gravity of the portion of the image blur correction device 400 capable of moving in the yawing direction (the portion made up of the pitching movement frame 405, the yawing movement frame 408, etc.) is closer to the center C of the third lens group G3 when viewed in the X axial direction.

For example, let us assume that the center of gravity of the movable portion of the image blur correction device 400 is near the center C of the third lens group G3 when the weight W (N) of the movable portion is acting on the Y axial direction positive side. If we let L (meters) be the distance from the rotational axis A3 to the action point of the weight W, and L1 (meters) be the distance from the rotational axis A3 to the center Py of the coil 406b, then the electromagnetic force Fy (N) required at the electromagnetic actuator 414 in order to support the weight W is found as follows from the moment equilibrium.

$$Fy \times L1 = W \times L$$

As shown in FIG. 13, because L<L1, the relationship Fy<W is established. That is, drive in the yawing direction is possible with a driving force that is smaller than the force supporting the actual weight.

With the constitution discussed above, the electromagnetic force Fy required at the electromagnetic actuator 414 can be smaller than with a conventional image blur correction device. This allows the electromagnetic actuator 414 to be smaller and also reduces the power consumption of the image blur correction device 400.

(5.8)

With this image blur correction device 400, the distance L2 between the rotational axis A3 and the detection center Ry of the hole element 406d is shorter than the distance L1 between the rotational axis A3 and the center Py of the coil 406b. Therefore, the movable range of the hole element 406d in the yawing direction is smaller, and as a result, the movable range of the detection center Ry of the hole element 406d can fit within the usable region of the magnet 462e. This prevents a decrease in position detection accuracy in the yawing direction.

(5.9)

With this image blur correction device 400, the portion of the pitching movement frame 405 to which the third lens group G3 is fixed needs to be strong enough to support the third lens group G3. Therefore, a part of the pitching movement frame 405 is always present around the third lens group G3. In this embodiment, when viewed in the X axial direction, the third lens group G3 is surrounded by the pitching movement frame 405.

On the other hand, if the rotational axis A3 is disposed on the opposite side of the electromagnetic actuator 412 from the third lens group G3, the external size of the apparatus will increase in proportion to the portion where the rotational axis A3 is formed from the electromagnetic actuator 412.

However, with this image blur correction device 400, the rotational axis A3 is disposed in a region between the electromagnetic actuator 412 and the third lens group G3. Therefore, the space around the third lens group G3 can be utilized more effectively and the size of the apparatus can be reduced. The dimension in the Z axial direction in particular can be shortened.

(5.10)

With this image blur correction device 400, the distance L3 between the rotational axis A3 and the detection center Rp of the hole element 406c is shorter than the distance L4 between the rotational axis A3 and the center Pp of the coil 406a. Therefore, the movable range of the hole element 406c in the yawing direction is smaller than the movable range of the coil 406a in the yawing direction. As a result, the movable range of the detection center Rp of the hole element 406c can fit within the usable region of the magnet 462c. This prevents a decrease in position detection accuracy in the pitching direction.

(5.11)

With this image blur correction device 400, the flexible portion 492 of the flexible printed circuit board 490 is disposed on the rotational axis A3 side of the third lens group G3. Therefore, the amount of deformation of the flexible portion 492 when the pitching movement frame 405 moves in the yawing direction can be suppressed, and disconnection of the flexible printed circuit board 490 can be prevented.

Also, if there is less deformation of the flexible portion 492, the driving force is smaller when the pitching movement frame 405 is driven in the yawing direction. This reduces power consumption with this image blur correction device 400.

(5.12)

With this image blur correction device 400, the third lens group G3 is disposed in a region between the electromagnetic actuator 414 and the electromagnetic actuator 412. That is, the electromagnetic actuator 412 and the electromagnetic actuator 414 are disposed on both sides of the third lens group G3. Therefore, the image blur correction device 400 becomes longer in approximately one direction (the Z axial direction as the pitching direction) in this embodiment). In other words, it is possible to shorten the dimension in the Y axial direction (yawing direction) perpendicularly intersecting the Z axial direction.

(5.13)

With this image blur correction device 400, the relative movement of the yawing movement frame 408 and the third group frame 462 to the X axial direction positive side and negative side is restricted by the yawing guide mechanism 480. This stabilizes the position of the yawing movement frame 408 in the second optical axis A2 direction with respect to the third-group frame 462 in the rotation of the yawing movement frame 408, and prevents a decrease in optical performance, such as when the subject is out of focus.

Also, one of the first and second support portions is rod-shaped, and the other is substantially U-shaped. Therefore, the movement of the yawing movement frame 408 in the second optical axis A2 direction with respect to the third group frame 462 can be restricted with a simple constitution.

(5.14)

This image blur correction device 400 is mounted in a digital camera 1 equipped with a folding optical system. More specifically, as shown in FIG. 6, the image blur correction device 400 is disposed such that the third lens group G3 is movable in a plane perpendicularly intersecting the second optical axis A2. The image blur correction device 400 is disposed such that the pitching direction perpendicularly intersects the first optical axis A1 and the second optical axis A2, that is, such that the Y axial direction (yawing direction) is approximately parallel to the first optical axis A1.

In this case, since the image blur correction device 400 is smaller in size in the Y axial direction, the size in the first optical axis A1 direction can be reduced, that is, the digital camera 1 can be made thinner.

Also, with this image blur correction device 400, a decrease in image blur correction performance can be prevented as discussed above. Accordingly, with this digital camera 1 it is possible to obtain a high-quality image in which image blur has been corrected.

(5.15)

The method for manufacturing the image blur correction device 400 includes the steps of moving the yawing movement frame 408 in a direction perpendicularly intersecting the rotational axis A3 with respect to the third group frame 462, and attaching the pin 430 for rotatably linking the yawing movement frame 408 and the third group frame 462, to the yawing movement frame 408 and the third group frame 462. The pin 430 is press-fitted into the hole 482a of the second bearing 482. This allows the step of adhesively bonding the pin 430 to be eliminated and reduces the manufacturing cost.

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

Second Embodiment

Figure 18:
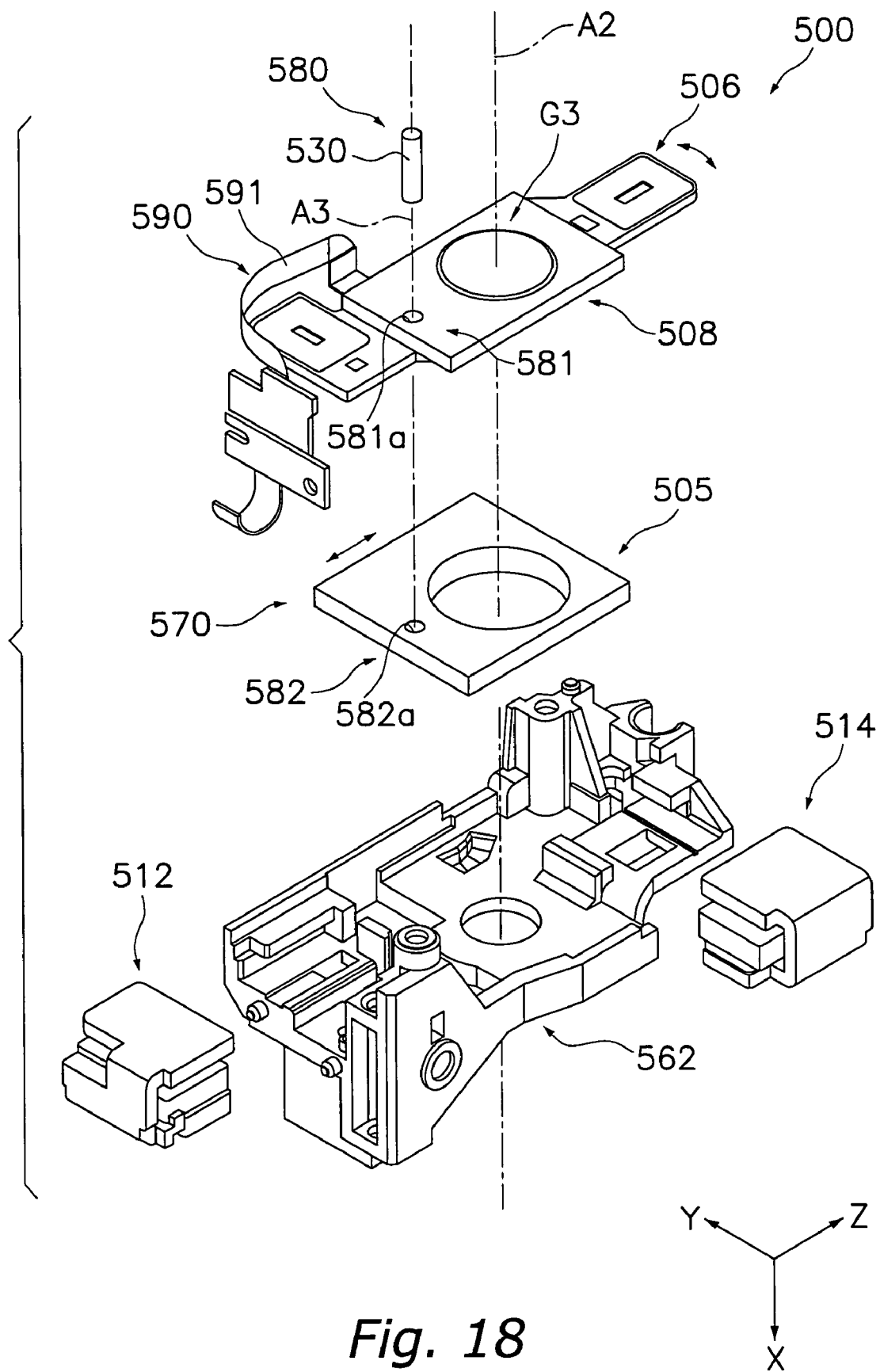
FIG. 18 is an exploded perspective view of an image blur correction device (other embodiment).

With the image blur correction device 400 discussed above, the yawing movement frame 408 is movably supported by the third group frame 462, but a yawing movement frame may instead be rotatably supported by a pitching movement frame, as with the image blur correction device 500 shown in FIG. 18, for example. In this case, a pitching movement frame 505 is supported by a third group frame 562 via a pitching guide mechanism 570 so as to be capable of linear motion in the yawing direction. A yawing movement frame 508 is fixed to an electrical board 506. The yawing movement frame 508 and the electrical board 506 are rotatably supported by the pitching movement frame 505 via a yawing guide mechanism 580. The third lens group G3 is fixed to the yawing movement frame 508. The pitching movement frame 505 and the yawing movement frame 508 are rotatably linked by a pin 530. The pitching movement frame 505 is supported with respect to the third group frame 562 by three support components.

Figure 19:
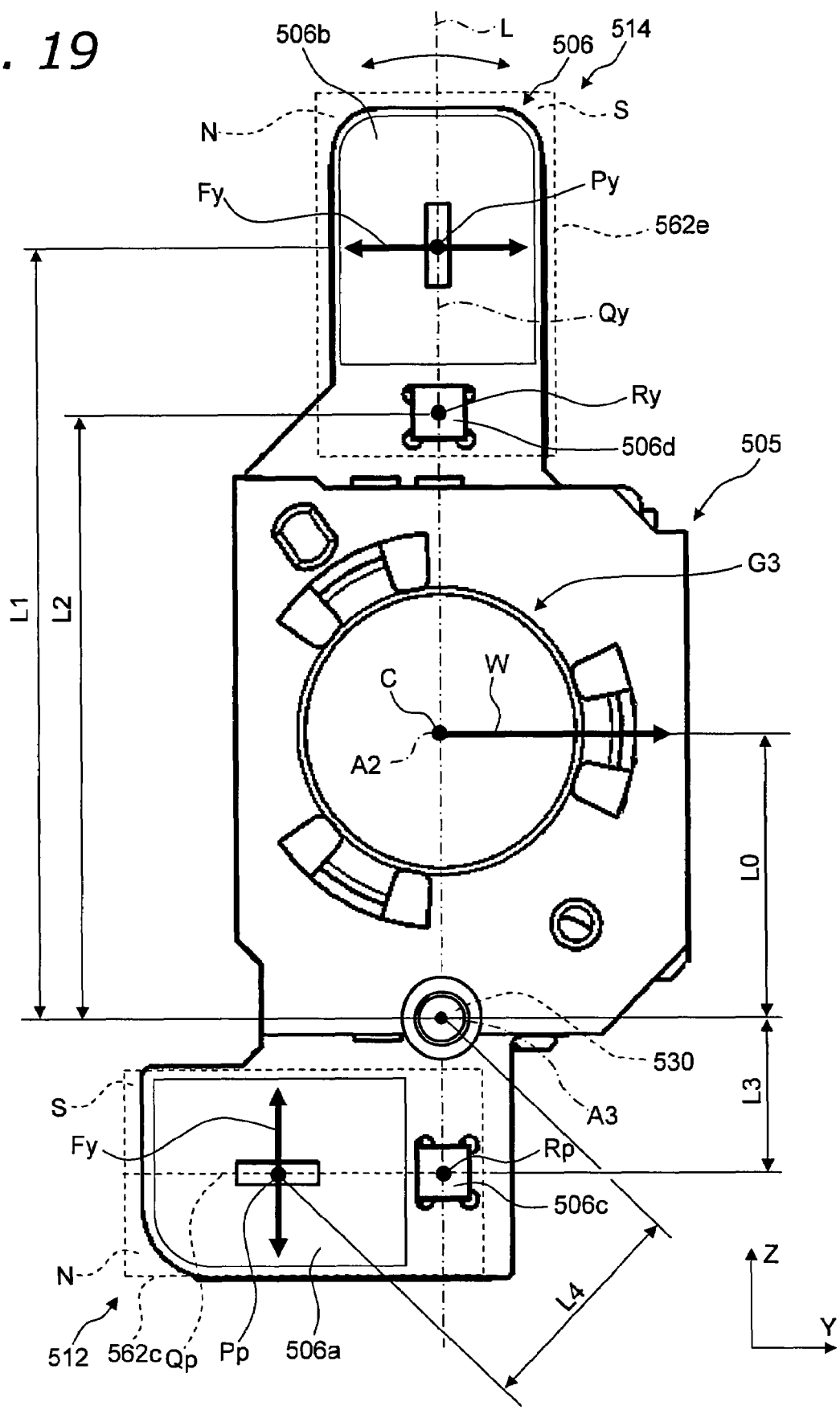
FIG. 19 is a simplified plan view of the pitching movement frame and the electrical board as seen from the X axial direction positive side (other embodiment).
Figure 20:
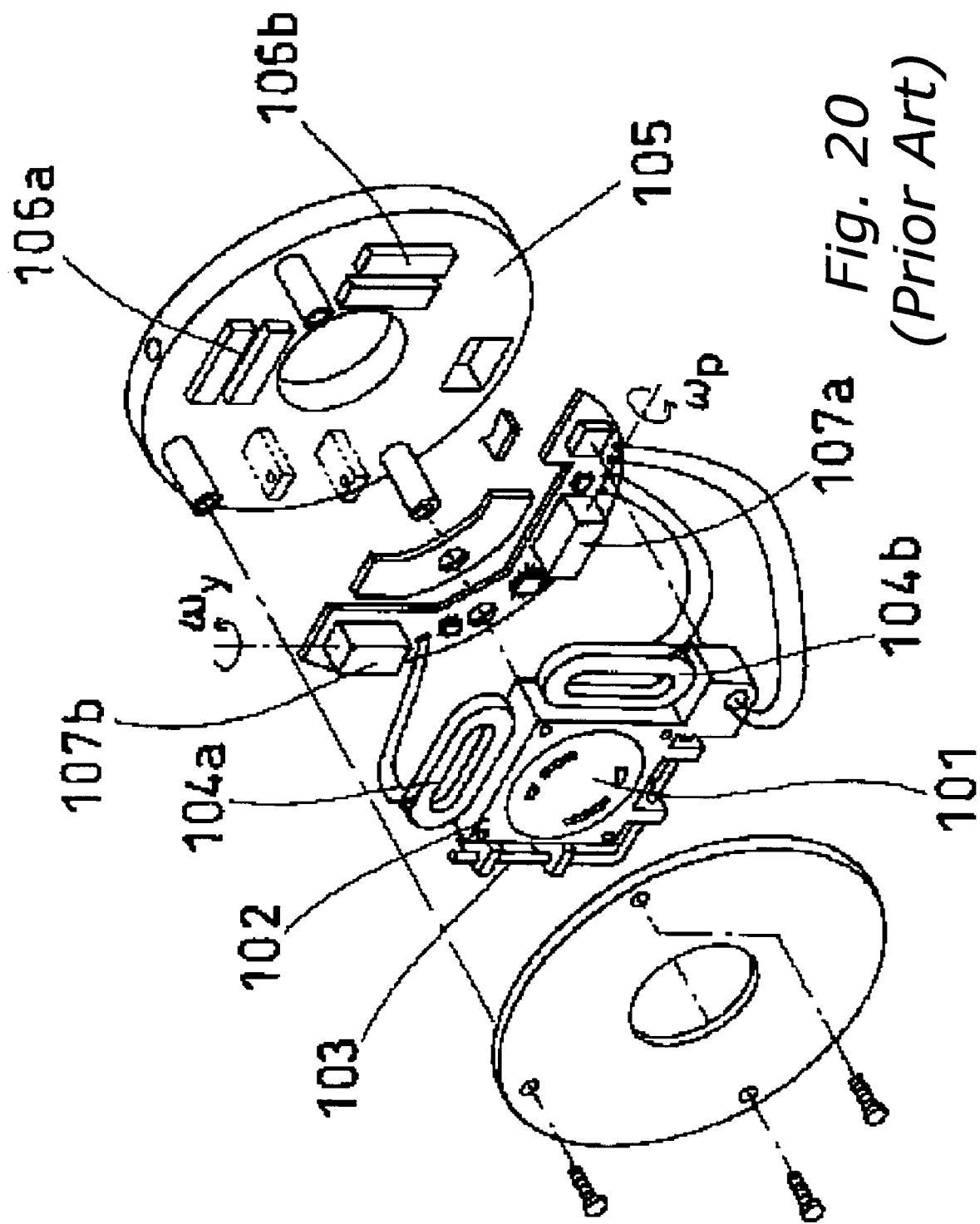
FIG. 20 is an exploded perspective view of an image blur correction device as prior art.
Figure 21:
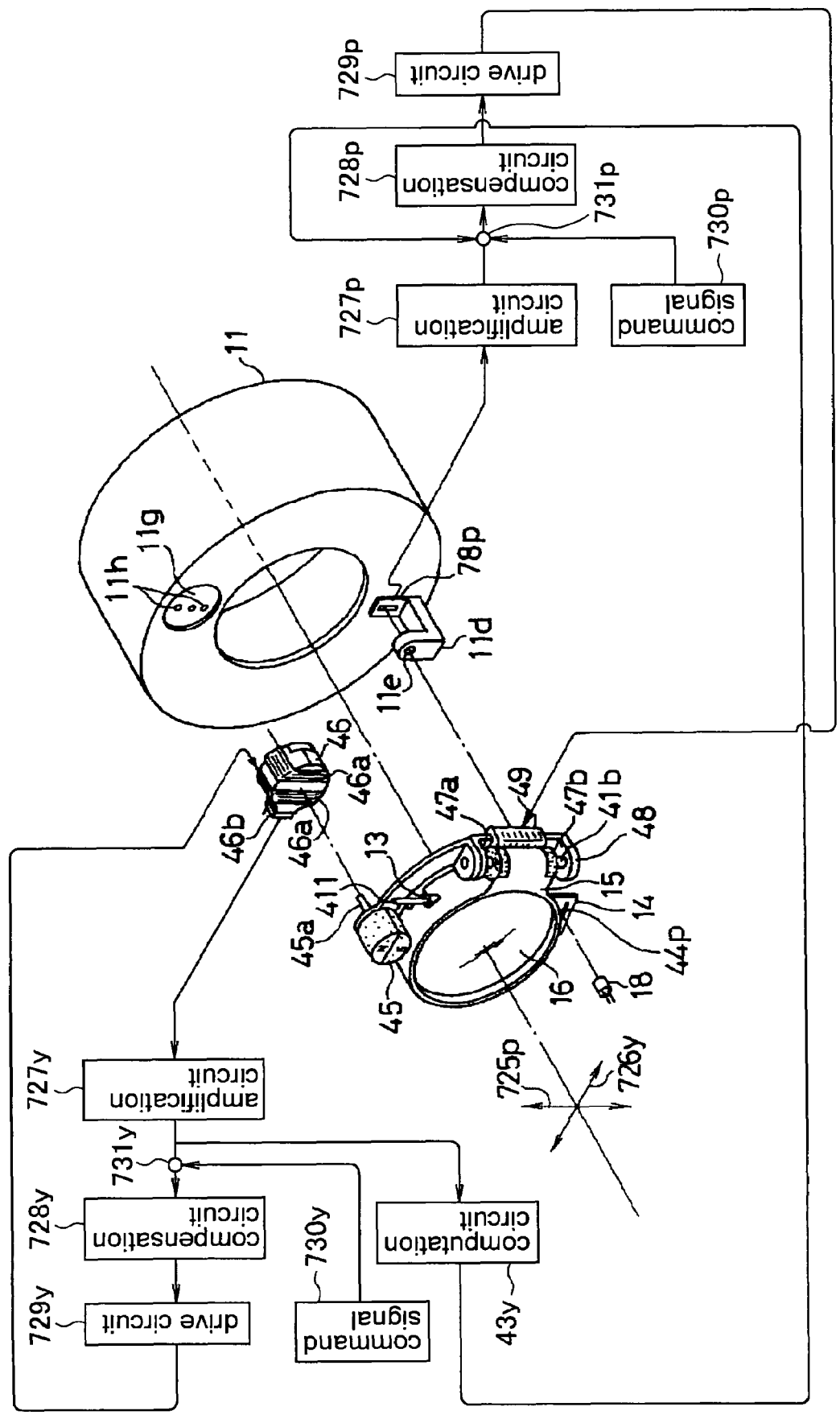
FIG. 21 is an exploded perspective view of an image blur correction device as prior art.
Figure 22:
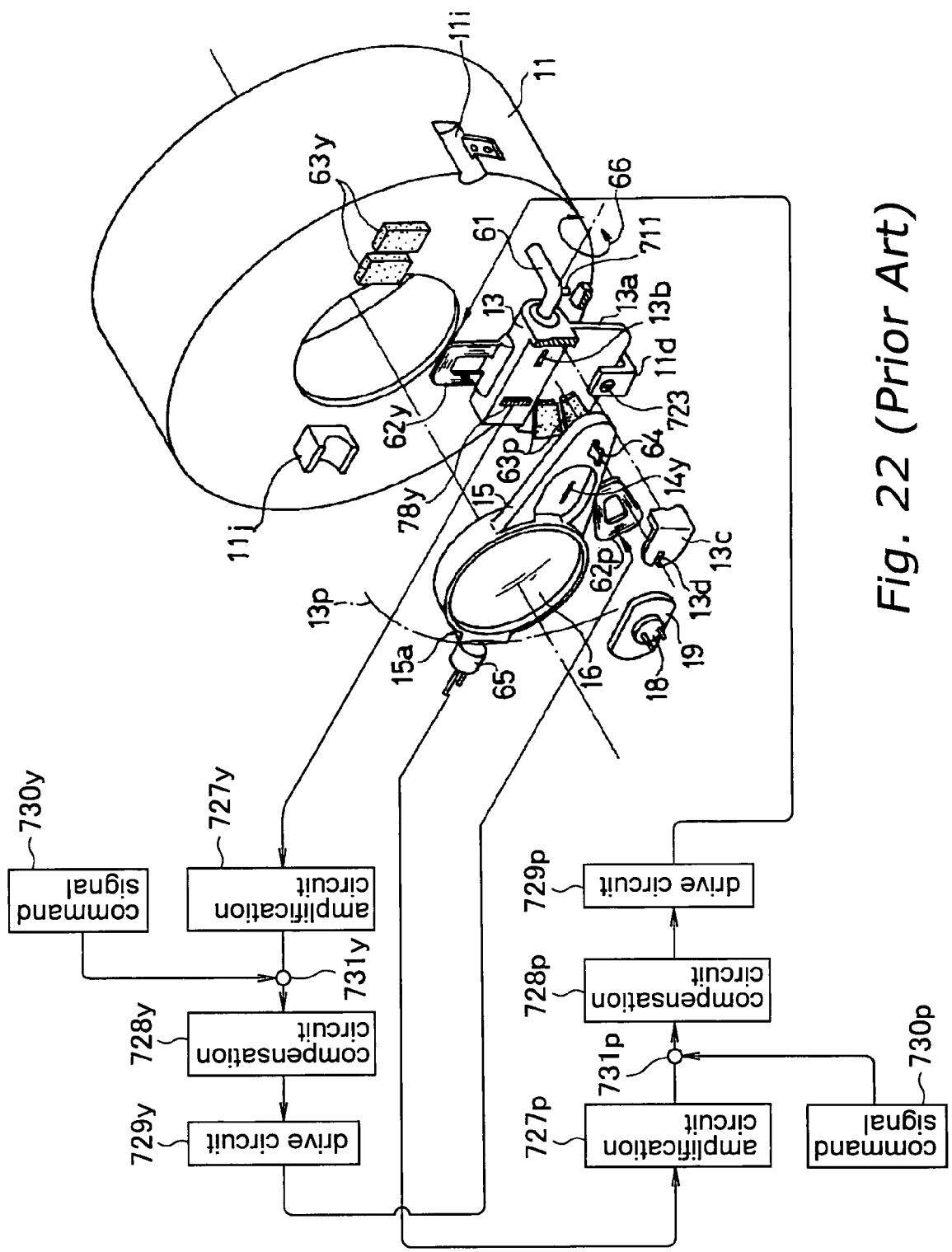
FIG. 22 is an exploded perspective view of an image blur correction device as prior art.

As shown in FIG. 19, the planar disposition of the constituent components of this image blur correction device 500 is the same as with the image blur correction device 400 described above. The same effect is obtained with this image blur correction device 500 as with the image blur correction device 400 described above, as shown below.

(1.1)

With this image blur correction device 500, the yawing movement frame 508 rotates in the yawing direction around the rotational axis A3 with respect to the pitching movement frame 505. Therefore, a shaft for guiding in the yawing direction is unnecessary. This affords a reduction in size in the direction perpendicular to the pitching direction.

In addition, with this image blur correction device 500, driving force from the electromagnetic actuator 512 and the electromagnetic actuator 514 is directly imparted to the yawing movement frame 508 to which the third lens group G3 is fixed (more precisely, to the electrical board 506 to which the yawing movement frame 508 is fixed). Therefore, a decrease in the positional accuracy of the third lens group G3 can be prevented better, and a decrease in image blur correction performance can be prevented better, than when the driving force of the electromagnetic actuators 512 and 514 does not act directly on the yawing movement frame 508.

Because of the above, with this image blur correction device 500, a decrease in image blur correction performance can be prevented while a smaller size can be achieved at the same time.

(1.2)

With this image blur correction device 500, in a state in which the detection center Ry of the hole element 506d coincides with the polarization line Qy of the magnet 562e, the direction of the polarization line Qy of the magnet 562e substantially coincides with the pitching direction (Z axial direction, linear direction). Therefore, when the yawing movement frame 508 is driven in the pitching direction via the pitching movement frame 505, misalignment is suppressed in the yawing direction (rotational direction) between the detection center Ry of the hole element 506d and the polarization line Qy of the magnet 562e. As a result, the movable range of the detection center Ry of the hole element 506d tends to fit within the usable region of the magnet 562e. This prevents a decrease in position detection accuracy in the yawing direction from accompanying operation in the pitching direction.

Here, the phrase "the direction of the polarization line Qy of the magnet 562e substantially coincides with the pitching direction (Z axial direction)" encompasses a case in which the polarization line Qy and the pitching direction are misaligned in a state in which the movable range of the detection center Ry of the hole element 506d fits within the usable region of the magnet 562e, as well as a case in which the polarization line Qy completely coincides with the pitching direction.

(1.3)

With this image blur correction device 500, in a state in which the second optical axis A2 coincides with the center C of the third lens group G3, the detection center Ry of the hole element 506d substantially coincides with the polarization line Qy of the magnet 562e. Therefore, the range of the detection center Ry of the hole element 506d tends to fit within the usable region of the magnet 562e in a state in which the center C of the third lens group G3 coincides with the second optical axis A2. This prevents a decrease in position detection accuracy in the yawing direction.

Here, the phrase "the detection center Ry of the hole element 506d substantially coincides with the polarization line Qy of the magnet 562e" encompasses a case in which the polarization line Qy and the detection center Ry are misaligned in a state in which the movable range of the detection center Ry of the hole element 506d fits within the usable region of the magnet 562e, as well as a case in which the polarization line Qy completely coincides with the detection center Ry.

(1.4)

With this image blur correction device 500, the rotational axis A3, the center C of the third lens group G3, and the detection center Ry of the hole element 506d are disposed approximately on the straight line L. Therefore, when the yawing movement frame 508 is driven in the pitching direction, misalignment is suppressed between the detection center Ry of the hole element 506d and the polarization line Qy of the magnet 562e. As a result, the movable range of the detection center Ry of the hole element 506d tends to fit within the usable region of the magnet 562e. This prevents a decrease in position detection accuracy in the yawing direction.

Here, the phrase "the rotational axis A3, the center C of the third lens group G3, and the detection center Ry of the hole element 506d are disposed approximately on the straight line L" encompasses a case in which the rotational axis A3, the optical axis center, and the detection center Ry are misaligned in a state in which the movable range of the detection center Ry of the hole element 506d fits within the usable region of the magnet 562e, as well as a case in which the rotational axis A3, the optical axis center, and the detection center Ry are disposed on a single straight line.

(1.5)

With this image blur correction device 500, a line segment connecting the rotational axis A3 and the detection center Rp of the hole element 506c substantially coincides with the pitching direction (Z axial direction). Therefore, the movable range of the detection center Rp of the hole element 506c tends to fit within the usable region of the magnet 562e in a state in which the second optical axis A2 coincides with the center C of the third lens group G3. This prevents a decrease in position detection accuracy in the pitch direction.

Here, the phrase "a line segment connecting the rotational axis A3 and the detection center Rp of the hole element 506c substantially coincides with the pitching direction" encompasses a case in which this line segment and the pitching direction are misaligned to the extent that a decrease in position detection accuracy in the pitching direction can be prevented, as well as a case in which this line segment completely coincides with the pitching direction.

(1.6)

With this image blur correction device 500, in a state in which the second optical axis A2 coincides with the center C of the third lens group G3, the detection center Rp of the hole element 506c substantially coincides with the polarization line Qp of the magnet 562c. Therefore, when the yawing movement frame 508 is driven in the yawing direction, misalignment is suppressed between the detection center Rp of the hole element 506c and the polarization line Qp of the magnet 562c. As a result, the movable range of the detection center Rp of the hole element 506c tends to fit within the usable region of the magnet 562c. This prevents a decrease in position detection accuracy in the pitching direction.

Here, the phrase "the detection center Rp of the hole element 506c substantially coincides with the polarization line Qp of the magnet 562c" encompasses a case in which the detection center Rp and the polarization line Qp are misaligned to the extent that a decrease in position detection accuracy in the pitching direction can be prevented, as well as a case in which the detection center Rp completely coincides with the polarization line Qp.

(1.7)

With this image blur correction device 500, the distance L1 between the rotational axis A3 and the center Py of the coil 506b is longer than the distance L0 between the rotational axis A3 and the center C of the third lens group G3. Therefore, the center of gravity of the portion of the image blur correction device 500 capable of moving in the yawing direction (the third lens group G3, the yawing movement frame 508, and the electrical board 506) is closer to the center C of the third lens group G3 when viewed in the X axial direction.

For example, let us assume that the center of gravity of the movable portion of the image blur correction device 500 is near the center C of the third lens group G3 when the weight W (N) of the movable portion is acting on the Y axial direction positive side. If we let L (meters) be the distance from the rotational axis A3 to the action point of the weight W, and L1 (meters) be the distance from the rotational axis A3 to the center Py of the coil 506b, then the electromagnetic force Fy (N) required at the electromagnetic actuator 514 in order to support the weight W is found as follows from the moment equilibrium.

$$Fy \times L1 = W \times L$$

As shown in FIG. 19, because L<L1, the relationship Fy<W is established. That is, drive in the yawing direction is possible with a driving force that is smaller than the force supporting the actual weight.

With the constitution discussed above, the electromagnetic force Fy required at the electromagnetic actuator 514 can be smaller than with a conventional image blur correction device. This allows the electromagnetic actuator 514 to be smaller and also reduces the power consumption of the image blur correction device 500.

(1.8)

With this image blur correction device 500, the distance L2 between the rotational axis A3 and the detection center Ry of the hole element 506d is shorter than the distance L1 between the rotational axis A3 and the center Py of the coil 506b. Therefore, the movable range of the hole element 506d in the yawing direction is smaller, and as a result, the movable range of the detection center Ry of the hole element 506d can fit within the usable region of the magnet 562e. This prevents a decrease in position detection accuracy in the yawing direction.

(1.9)

With this image blur correction device 500, the portion of the yawing movement frame 508 to which the third lens group G3 is fixed needs to be strong enough to support the third lens group G3. Therefore, a part of the yawing movement frame 508 is always present around the third lens group G3. In this embodiment, when viewed in the X axial direction, the third lens group G3 is surrounded by the yawing movement frame 508.

On the other hand, if the rotational axis A3 is disposed on the opposite side of the electromagnetic actuator 512 from the third lens group G3, the external size of the apparatus will increase in proportion to the portion where the rotational axis A3 is formed from the electromagnetic actuator 512.

However, with this image blur correction device 500, the rotational axis A3 is disposed in a region between the electromagnetic actuator 512 and the third lens group G3. Therefore, the space around the third lens group G3 can be utilized more effectively and the size of the apparatus can be reduced. The dimension in the Z axial direction in particular can be shortened.

(1.10)

With this image blur correction device 400, the distance L3 between the rotational axis A3 and the detection center Rp of the hole element 506c is shorter than the distance L4 between the rotational axis A3 and the center Pp of the coil 506a. Therefore, the movable range of the hole element 506c in the yawing direction is smaller than the movable range of the coil 506a in the yawing direction. As a result, the movable range of the detection center Rp of the hole element 506c can fit within the usable region of the magnet 562c. This prevents a decrease in position detection accuracy in the pitching direction.

(1.11)

With this image blur correction device 500, the flexible portion 591 of the flexible printed circuit board 590 is disposed on the rotational axis A3 side of the third lens group G3. Therefore, the amount of deformation of the flexible portion 591 when the yawing movement frame 508 moves in the yawing direction can be suppressed, and disconnection of the flexible printed circuit board 590 can be prevented.

(1.12)

With this image blur correction device 500, the third lens group G3 is disposed in a region between the electromagnetic actuator 514 and the electromagnetic actuator 512. That is, the electromagnetic actuator 512 and the electromagnetic actuator 514 are disposed on both sides of the third lens group G3. Therefore, the image blur correction device 500 becomes longer in approximately one direction (the Z axial direction (as the pitching direction) in this embodiment). In other words, it is possible to shorten the dimension in the Y axial direction (yawing direction) perpendicularly intersecting the Z axial direction in which the image blur correction device 500 is longer.

(1.13)

With this image blur correction device 500, the relative movement of the yawing movement frame 508 and the pitching movement frame 505 to the X axial direction positive side and negative side is restricted by the yawing guide mechanism 580. This stabilizes the position of the yawing movement frame 508 in the second optical axis A2 direction with respect to the pitching movement frame 505 during rotation, and prevents a decrease in image blur correction performance.

Also, one of the first and second support portions is rod-shaped, and the other is substantially U-shaped. Therefore, the movement of the yawing movement frame 508 in the second optical axis A2 direction with respect to the pitching movement frame 505 can be restricted with a simple constitution.

(1.14)

This image blur correction device 500 is mounted in a digital camera 1 equipped with a folding optical system. More specifically, the image blur correction device 500 is disposed such that the third lens group G3 is movable in a plane perpendicularly intersecting the second optical axis A2. The image blur correction device 500 is disposed such that the pitching direction perpendicularly intersects the first optical axis A1 and the second optical axis A2, that is, such that the Y axial direction (yawing direction) is approximately parallel to the first optical axis A1.

In this case, since the image blur correction device 500 is smaller in size in the Y axial direction, the size in the first optical axis A1 direction can be reduced, that is, the digital camera 1 can be made thinner.

Also, with this image blur correction device 500, a decrease in image blur correction performance can be prevented as discussed above. Accordingly, with this digital camera 1 it is possible to obtain a high-quality image in which image blur has been corrected.

(1.15)

The method for manufacturing the image blur correction device 500 includes the steps of moving the yawing movement frame 508 in a direction perpendicularly intersecting the rotational axis A3 with respect to the pitching movement frame 505, and attaching the pin 530 for rotatably linking the yawing movement frame 508 and the pitching movement frame 505, to the yawing movement frame 508 and the pitching movement frame 505.

The yawing movement frame 508 has a first bearing 581. The pitching movement frame 505 has a second bearing 582. The first bearing 581 has a hole 581a, and the second bearing 582 has a hole 582a.

In the assembly step, the pin 530 is press-fitted into the hole 582a of the second bearing 582. This allows the step of adhesively bonding the pin 530 to be eliminated and reduces the manufacturing cost.

(2) Comparison of First and Second Embodiments

The differences between the constitutions of the image blur correction device 400 according to the first embodiment and of the image blur correction device 500 according to the second embodiment will now be discussed.

As discussed above, with the image blur correction device 400, the pitching movement frame 405, which moves linearly in the pitching direction, is supported by the yawing movement frame 408, which rotates in the yawing direction. Therefore, the electromagnetic actuator 412 need only drive the third lens group G3, the pitching movement frame 405, and the electrical board 406, but the electromagnetic actuator 414 must drive the third lens group G3, the pitching movement frame 405, and the electrical board 406 in addition to the yawing movement frame 408. That is, the load of the electromagnetic actuator 414 tends to be high.

However, as mentioned above, the driving force required at the electromagnetic actuator 414 can be reduced by increasing the distance between the rotational axis A3 and the center Py of the coil 406b. Therefore, the load of the electromagnetic actuator 414 can be reduced by adjusting the disposition of the electromagnetic actuator 414.

With the image blur correction device 500, on the other hand, the yawing movement frame 508, which rotates in the yawing direction, is supported by the pitching movement frame 505, which moves linearly in the pitching direction. Therefore, the electromagnetic actuator 514 need only drive the third lens group G3, the yawing movement frame 508, and the electrical board 506, but the electromagnetic actuator 512 must drive the yawing movement frame 508 and the electrical board 506 in addition to the pitching movement frame 505. That is, the load of the electromagnetic actuator 512 tends to be high.

In this case, unlike in the case of the image blur correction device 400, the load of the electromagnetic actuator 512 cannot be reduced by adjusting the position of the electromagnetic actuator 512.

Thus, with an image blur correction device that combines a rotary mechanism and a linear mechanism, the load during drive for the apparatus as a whole can be reduced more with a constitution in which a linearly moving member is supported by a rotary member as in the first embodiment. That is, the image blur correction device 400 affords a greater reduction in load during drive than does the image blur correction device 500.

Other Embodiments

The specific constitution of the present invention is not limited to the embodiments given above, and various modifications and alterations are possible without exceeding the gist of the invention.

(1.1)

The above-mentioned image blur correction device 400 and 500 can be mounted in a camera other than the digital camera 1 equipped with a folding optical system. Here again, it is possible to reduce the size of the camera while still preventing a decrease in image blur correction performance.

(1.2)

The disposition and shape of the first support portions and second support portions are not limited to what was discussed above. For instance, the first support portions 483, 484, and 485 may be formed in the third group frame 462, and the second support portions 486, 487, and 488 may be formed in the yawing movement frame 408. Also, the three first support portions 483, 484, and 485 formed in the yawing movement frame 408 may be substantially U-shaped, and the three second support portions 486, 487, and 488 formed in the third group frame 462 may be rod-shaped. Furthermore, "substantially U-shaped" may encompass other shapes as long as there are two portions extending parallel to each other.

(1.3)

In the above embodiments, the magnets of the electromagnetic actuators had undergone dipole magnetization, but the method for magnetizing the magnets is not limited to this. For instance, the method for magnetizing the magnets may be single pole magnetization, tripole magnetization, or the like. If the magnets have undergone tripole magnetization, a magnet will have two polarization lines, and as long as one of these polarization lines coincides with the detection center of the hole element, then the polarization line and the detection center can be said to coincide.

Also, if the method for magnetizing the magnets is single pole magnetization, there will be no polarization line. In this case, the center line of the range over which performance can be guaranteed such that the magnetic magnetic flux density varies at a substantially constant ratio will correspond to the above-mentioned polarization line. Accordingly, in the case of single pole magnetization, this coinciding of the center line and the detection center corresponds to the coinciding of the above-mentioned polarization line and the detection center.

Also, in the above embodiments, the N pole portion and S pole portion of the magnet were physically integrated, but the magnet is not limited to this state. For instance, the N pole portion and S pole portion may be physically separated, or the boundary line at which polarity changes can be the polarization line.

General Interpretation of Terms

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image blur correction device for correcting the blur of an image caused by movement of a camera, comprising:
   a lens support member to which a correction lens included in the optical system of the camera is fixed;
   a first support member that supports the lens support member to be movable in one direction selected from among a linear direction that is any direction within a plane perpendicularly intersecting the optical axis of light incident on the correction lens, and a rotational direction that follows an arc whose center is a rotational axis substantially parallel to the optical axis within the plane;
   a second support member that supports the first support member to be movable in the other direction selected from among the linear and rotational directions;
   a drive unit for linearly driving that imparts a driving force to the lens support member in order to drive the lens support member in the linear direction; and
   a drive unit for rotationally driving that imparts a driving force to the lens support member in order to drive the lens support member in the rotational direction.

2. The image blur correction device according to claim 1, further comprising a rotational position detection element for detecting the position of the lens support member in the rotational direction,
   wherein the drive unit for rotationally driving has a magnet for rotationally driving,
   the magnetic flux density distribution of the magnet for rotationally driving in the rotational direction includes a usable region for rotational position detection, in which the magnetic flux density varies at a substantially constant ratio, and
   there exists a state in which, when viewed along the optical axis, the detection center of the rotational position detection element coincides with the center line of the usable region for rotational position detection in the rotational direction, within the movable range of the lens support member.

3. The image blur correction device according to claim 2, wherein, when viewed along the optical axis, in a state in which the detection center of the rotational position detection element coincides with the center line of the usable region for rotational position detection in the rotational direction, the direction of the center line of the usable region for rotational position detection in the rotational direction substantially coincides with the linear direction.

4. The image blur correction device according to claim 2, wherein, when viewed along the optical axis, in a state in which the optical axis of light incident on the correction lens coincides with the center of the correction lens, the detection center of the rotational position detection element substantially coincides with the center line of the usable region for rotational position detection in the rotational direction.

5. The image blur correction device according to claim 2, wherein, when viewed along the optical axis, the rotational axis, the center of the correction lens, and the detection center of the rotational position detection element are disposed substantially on a straight line.

6. The image blur correction device according to claim 1, further comprising a linear position detection element for detecting the position of the lens support member in the linear direction,
   wherein, when viewed along the optical axis, a line segment connecting the rotational axis and the detection center of the linear position detection element substantially coincides with the linear direction.

7. The image blur correction device according to claim 1, further comprising a linear position detection element for detecting the position of the lens support member in the linear direction,
   wherein the drive unit for linearly driving has a magnet for linearly driving,
   the magnetic flux density distribution of the magnet for linearly driving in the linear direction includes a usable region for linear position detection, in which the magnetic flux density varies at a substantially constant ratio, and
   there exists a state in which, when viewed along the optical axis, the detection center of the linear position detection element within the movable range of the lens support member coincides with the center axis of the usable region for linear position detection in the linear direction.

8. The image blur correction device according to claim 7, wherein, when viewed along the optical axis, in a state in which the optical axis of light incident on the correction lens coincides with the center of the correction lens, the detection center of the linear position detection element substantially coincides with the center line of the usable region for linear position detection in the linear direction.

9. The image blur correction device according to claim 1, wherein the drive unit for rotationally driving has a magnet for rotationally driving and a coil for rotationally driving disposed across from the magnet for rotationally driving, and
when viewed along the optical axis, the distance between the rotational axis and the center of the coil for rotationally driving is longer than the distance between the rotational axis and the center of the correction lens.

10. The image blur correction device according to claim 1, wherein the drive unit for rotationally driving has a magnet for rotationally driving and a coil for rotationally driving disposed across from the magnet for rotationally driving, and
when viewed along the optical axis, the distance between the rotational axis and the detection center of the rotational position detection element is shorter than the distance between the rotational axis and the center of the coil for rotationally driving.

11. The image blur correction device according to claim 1, wherein the rotational axis is disposed in a region between the drive unit for linearly driving and the correction lens.

12. The image blur correction device according to claim 1, further comprising a linear position detection element for detecting the position of the lens support member in the linear direction,
wherein the drive unit for linearly driving has a magnet for linearly driving and a coil for linearly driving disposed across from the magnet for linearly driving, and
the distance between the rotational axis and the detection center of the linear position detection element is shorter than the distance between the rotational axis and the center of the coil for linearly driving.

13. The image blur correction device according to claim 1, further comprising a flexible printed circuit board electrically connected to the drive unit for rotationally driving in order to supply voltage to the drive unit for rotationally driving,
wherein the flexible printed circuit board has a first fixed portion that is fixed to the lens support member, a second fixed portion that is fixed to the second support member, and a flexible portion that links the first and second fixed portions and is bendable, and
the flexible portion is disposed on the rotational axis side of the correction lens.

14. The image blur correction device according to claim 1, wherein the correction lens is disposed in a region between the drive unit for rotationally driving and the drive unit for linearly driving.

15. The image blur correction device according to claim 1, further comprising at least three support portions, which support a rotary member so as to be movable in a plane perpendicularly intersecting the optical axis with respect to a rotary support member, and which limit relative movement between the rotary member and the rotary support member to both sides along the optical axis,
wherein the rotary member is one of the lens support member and the first support member and is movably supported in the rotational direction, the rotary support member is one of the first and second support members and supports the rotary member.

16. The image blur correction device according to claim 15, wherein each of the at least three support portions has a first support portion formed on the rotary member, and a second support portion that is formed on the rotary support member and can be engaged with the first support portion in a direction perpendicular to the rotational axis,
one of the first and second support portions is a rod-shaped body, and
the other of the first and second support portions is an approximately U-shaped body that is engaged with the rod-shaped body.

17. A camera, comprising:
a first lens group that takes in light along a first optical axis;
a folding optical system for bending light incident along the first optical axis, along a second optical axis that intersects the first optical axis;
a second lens group that includes the correction lens for correcting image blur, and that takes in light bent by the folding optical system;
the image blur correction device according to claim 1;
an imaging unit for receiving light that has passed through the second lens group;
a lens barrel in which the first lens group, the folding optical system, the second lens group, the image blur correction device, and the imaging unit are disposed; and
a case for supporting the lens barrel.

18. The camera according to claim 17, wherein the linear direction is substantially parallel to a direction perpendicularly intersecting the first and second optical axis.

19. A method for manufacturing an image blur correction device having a lens support mechanism for supporting a correction lens included in an optical system for correcting image blur, and a rotary support member for supporting the lens support mechanism to be movable in the rotational direction along an arc whose center is a rotational axis substantially parallel to the optical axis, within a plane perpendicularly intersecting the optical axis of light incident on the correction lens, comprising:
moving a member on the lens support mechanism side in a direction perpendicularly intersecting the rotational axis with respect to the rotary support member; and
attaching a shaft member for rotatably linking the member on the lens support mechanism side and the rotary support member, to the rotary support member and the member on the lens support mechanism side.

20. A method for manufacturing an image blur correction device according to claim 19, wherein, in the attachment of the shaft member, the shaft member is press-fitted into either a first hole provided in the member on the lens support mechanism side, or a second hole provided in the rotary support member.

* * * * *